US007461787B2

(12) United States Patent
Chung

(10) Patent No.: US 7,461,787 B2
(45) Date of Patent: Dec. 9, 2008

(54) ELECTRONIC VOTING APPARATUS, SYSTEM AND METHOD

(75) Inventor: Kevin Kwong-Tai Chung, Princeton, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 11/384,764

(22) Filed: Mar. 20, 2006

(65) Prior Publication Data

US 2006/0169778 A1 Aug. 3, 2006

Related U.S. Application Data

(63) Continuation of application No. 09/737,306, filed on Dec. 15, 2000, now Pat. No. 7,036,730.

(60) Provisional application No. 60/252,012, filed on Nov. 20, 2000, provisional application No. 60/253,480, filed on Nov. 28, 2000, provisional application No. 60/253,778, filed on Nov. 29, 2000, provisional application No. 60/250,178, filed on Nov. 30, 2000, provisional application No. 60/251,920, filed on Dec. 7, 2000.

(51) Int. Cl.
*G06K 17/00* (2006.01)

(52) U.S. Cl. ....................................... 235/386; 235/375

(58) Field of Classification Search ................. 235/375, 235/386, 492, 383, 380, 381, 462.01, 472.01, 235/51, 50 R; 705/12
See application file for complete search history.

(56) References Cited

U.S. PATENT DOCUMENTS 3,163,758 A 12/1964 Treacy
3,648,022 A 3/1972 Cook
3,653,587 A 4/1972 Hammond et al.
3,710,105 A 1/1973 Oxendine, Jr. et al.
3,722,793 A 3/1973 Aronoff
3,739,151 A 6/1973 Moldovan, Jr. et al.
3,790,072 A 2/1974 Moldovan, Jr.
3,941,976 A 3/1976 Huhn (Continued)

FOREIGN PATENT DOCUMENTS

EP 0 419 335 A1 3/1991

(Continued)

OTHER PUBLICATIONS

Rebecca Mercuri, "Electronic Vote Tabulation Checks & Balances", 2001, pp. 1-117.*

(Continued)

*Primary Examiner*—Thien M Le
(74) *Attorney, Agent, or Firm*—Clement A. Berard, Esq.; Dann, Dorfman, Herrell & Skillman, PC

(57) ABSTRACT

A voting system and method that provides a printed confirmation of voting selections made comprises a voter interface for receiving voting selections made during a voting session; a processor for creating a voting record including the voting selections made during the voting session; a memory for storing the voting record; a printer for storing the voting record on a human readable and/or optically readable printed paper, and providing the printed paper for verifying the voting selections printed thereon. A voting session identifier may be utilized to provide transparency of each and every vote and may maintain the anonymity of the vote and voter.

46 Claims, 9 Drawing Sheets

U.S. PATENT DOCUMENTS

| | | | |
|---|---|---|---|
| 3,944,788 A | 3/1976 | Comisar et al. | |
| 3,977,357 A | 8/1976 | O'Neal et al. | |
| 4,010,353 A | 3/1977 | Moldovan, Jr. et al. | |
| 4,015,106 A | 3/1977 | De Phillipo | |
| 4,021,780 A | 5/1977 | Narey et al. | |
| 4,101,784 A | 7/1978 | Key et al. | |
| 4,153,895 A | 5/1979 | Weisbrod et al. | |
| 4,300,123 A | 11/1981 | McMillen et al. | |
| 4,357,596 A | 11/1982 | Feilchenfeld | |
| 4,373,134 A | 2/1983 | Grace et al. | |
| 4,459,021 A | 7/1984 | Blazek | |
| 4,479,194 A | 10/1984 | Fogg et al. | |
| 4,641,240 A | 2/1987 | Boram | |
| 4,649,264 A | 3/1987 | Carson | |
| 4,760,247 A | 7/1988 | Keane et al. | |
| 4,774,665 A | 9/1988 | Webb | |
| 4,807,908 A | 2/1989 | Gerbel | |
| 4,813,708 A | 3/1989 | Narey | |
| 5,038,392 A | 8/1991 | Morris et al. | |
| 5,073,700 A | 12/1991 | D'Onofrio | |
| 5,126,731 A | 6/1992 | Cromers, Jr. | |
| 5,164,601 A | 11/1992 | Nordstrom | |
| 5,189,288 A | 2/1993 | Anno et al. | |
| 5,191,525 A | 3/1993 | LeBrun et al. | |
| 5,213,373 A | 5/1993 | Ramos | |
| 5,218,528 A | 6/1993 | Wise et al. | |
| 5,247,166 A | 9/1993 | Cannon et al. | |
| 5,248,872 A | 9/1993 | Stewart | |
| 5,278,753 A | 1/1994 | Graft, III | |
| 5,365,026 A | 11/1994 | Cromers, Jr. et al. | |
| 5,377,099 A | 12/1994 | Miyagawa | |
| 5,400,248 A | 3/1995 | Chishom | |
| 5,474,295 A | 12/1995 | Demshuk | |
| 5,495,532 A | 2/1996 | Kilian et al. | |
| 5,497,318 A | 3/1996 | Miyagawa et al. | |
| 5,548,326 A | 8/1996 | Michael | |
| 5,572,601 A | 11/1996 | Bloomberg | |
| 5,583,329 A | 12/1996 | Davis, III et al. | |
| 5,585,612 A | 12/1996 | Harp, Jr. | |
| 5,610,383 A | 3/1997 | Chumbley | |
| 5,612,870 A | 3/1997 | Welner | |
| 5,612,871 A | 3/1997 | Skogmo | |
| 5,640,200 A | 6/1997 | Michael | |
| 5,710,420 A | 1/1998 | Martin et al. | |
| 5,719,386 A | 2/1998 | Hsieh et al. | |
| 5,732,222 A | 3/1998 | Miyagawa et al. | |
| 5,758,325 A | 5/1998 | Lohry et al. | |
| 5,821,508 A | 10/1998 | Willard | |
| 5,875,432 A | 2/1999 | Sehr | |
| 5,878,399 A | 3/1999 | Peralto | |
| 5,978,466 A | 11/1999 | Quattrocchi | |
| 6,014,438 A | 1/2000 | Quattrocchi | |
| 6,081,793 A | 6/2000 | Challener et al. | |
| 6,092,051 A | 7/2000 | Kilian et al. | |
| 6,250,548 B1 | 6/2001 | McClure et al. | |
| 6,412,692 B1 | 7/2002 | Miyagawa | |
| 6,457,643 B1 | 10/2002 | Way | |
| 6,505,778 B1 | 1/2003 | Reddersen et al. | |
| 6,540,138 B2 | 4/2003 | Hall et al. | |
| 6,550,675 B2 | 4/2003 | Davis et al. | |
| 6,581,824 B1 | 6/2003 | McClure et al. | |
| 6,607,126 B2 | 8/2003 | Altini et al. | |
| 6,607,137 B2 | 8/2003 | Morales | |
| 6,641,033 B2 | 11/2003 | McClure et al. | |
| 6,662,998 B2 | 12/2003 | McClure et al. | |
| 6,688,517 B1 | 2/2004 | McClure et al. | |
| 6,726,090 B1 | 4/2004 | Kargel | |
| 6,739,508 B2 | 5/2004 | Ushioda et al. | |
| 6,741,738 B2 | 5/2004 | Taylor | |
| 6,769,613 B2 | 8/2004 | McDermott | |
| 6,799,723 B2 | 10/2004 | Kotob et al. | |
| 6,817,515 B2 | 11/2004 | Winnett | |
| 6,854,644 B1 | 2/2005 | Bolton et al. | |
| 6,865,543 B2 | 3/2005 | Gibbs, Sr. | |
| 6,892,944 B2 * | 5/2005 | Chung et al. | 235/386 |
| 6,942,142 B2 | 9/2005 | Barmettler et al. | |
| 6,968,999 B2 | 11/2005 | Reardon | |
| 7,032,821 B2 | 4/2006 | McClure et al. | |
| 7,036,730 B2 * | 5/2006 | Chung | 235/386 |
| 7,080,779 B2 | 7/2006 | Cummings | |
| 7,100,828 B2 | 9/2006 | Cummings | |
| 7,111,782 B2 | 9/2006 | Homewood et al. | |
| 7,117,356 B2 | 10/2006 | La Cous | |
| 7,128,263 B1 | 10/2006 | Nguyen et al. | |
| 7,152,045 B2 | 12/2006 | Hoffman | |
| 7,152,792 B2 | 12/2006 | Gaston | |
| 7,178,730 B1 | 2/2007 | Jamison et al. | |
| 7,222,787 B2 | 5/2007 | Cummings | |
| 7,231,082 B2 | 6/2007 | Lenoir | |
| 7,243,846 B2 | 7/2007 | Reardon | |
| 2001/0013547 A1 | 8/2001 | Kotob et al. | |
| 2001/0035455 A1 | 11/2001 | Davis et al. | |
| 2002/0029163 A1 | 3/2002 | Joao | |
| 2002/0072961 A1 | 6/2002 | McDermott et al. | |
| 2002/0074399 A1 | 6/2002 | Hall et al. | |
| 2002/0078358 A1 | 6/2002 | Neff et al. | |
| 2002/0084325 A1 | 7/2002 | Reardon | |
| 2002/0091673 A1 | 7/2002 | Seibel et al. | |
| 2002/0092908 A1 | 7/2002 | Chumbley | |
| 2002/0161628 A1 | 10/2002 | Poor, Jr. et al. | |
| 2002/0175514 A1 | 11/2002 | Warther | |
| 2002/0194060 A1 | 12/2002 | Chernomorov | |
| 2003/0034393 A1 | 2/2003 | Chung | |
| 2003/0042731 A1 | 3/2003 | Li | |
| 2003/0062411 A1 | 4/2003 | Chung | |
| 2003/0066872 A1 | 4/2003 | McClure et al. | |
| 2003/0173404 A1 | 9/2003 | Chung | |
| 2004/0016803 A1 | 1/2004 | Cummings | |
| 2004/0046021 A1 | 3/2004 | Chung | |
| 2004/0060983 A1 | 4/2004 | Davis et al. | |
| 2004/0169077 A1 | 9/2004 | Petersen et al. | |
| 2004/0195323 A1 | 10/2004 | Vadura et al. | |
| 2004/0217168 A1 | 11/2004 | Cummings | |
| 2005/0092835 A1 | 5/2005 | Chung | |
| 2005/0161507 A1 | 7/2005 | Openshaw, II et al. | |
| 2005/0211778 A1 | 9/2005 | Biddulph | |
| 2006/0000906 A1 | 1/2006 | Reardon | |

FOREIGN PATENT DOCUMENTS

| | | |
|---|---|---|
| FR | 2 739 474 A1 | 4/1997 |
| IT | 1234224 | 5/1992 |
| JP | 7-57014 | 3/1995 |
| JP | 9-160988 | 6/1997 |
| WO | 96/02044 | 1/1996 |
| WO | WO99/52058 | 10/1999 |
| WO | 00/79469 | 12/2000 |

OTHER PUBLICATIONS

A. Riera, J. Borrell, J. Rifa, "An uncoercible verifiable electronic voting protocol," Proceedings of IFIP SEC '98, Online, Sep. 4, 1998, pp. 206-215, XP002272039, Austria.

Benaloh J et al, "Receipt-Free Secret-Ballot Elections (Extended Abstract)," Proceedings of the Annual ACM Symposium on the Theory of Computing, XX, XX, 1994, pp. 544-553, XP002099996.

Jinn-Ke Jan et al, "A Secure Electronic Voting Protocol With IC Cards," Security Technology, 1995. Proceedings, Institute of Electrical and Electronics Engineers 29th Annual 1995 International Carnahan Conference on Sanderstead, UK Oct. 18-20, 1995, New York, NY USA, Oct. 18, 1995, pp. 259-265, XP010196424.

esp@cenet—Document Bibliography and Abstract, "Voting Method And Means For Carrying Out This Method," Patent No. EP0419335, Publication Date: Mar. 27, 1991, Applicant: PGS SARL, Printed Apr. 29, 2004, 1 Page.

esp@cenet—Document Bibliography and Abstract, "No English Title Available," Patent No. FR2739474, Publication Date: Apr. 4, 1997, Printed Apr. 29, 2004, 1 Page.
English Language-Abstracts, For FR 2739474 A1 (WPI ACC No. 1997-238623/199722) and for EP 419335 A (WPI ACC No. 1991-088914/199113), <http://www.dialogclassic.com/COMMAND.HTML>, Printed Apr. 29, 2004, 1 Page.
Scientific Translation Services, FR 2739474, English Translation of pp. 5-6, and figures (Translated May 2004), 9 Pages.
Scientific Translation Services, "*Novel Voting Process and Means For Carrying Out Same*," [EPO 0 419 335 A1] English Translation of col. 1-10, (Translated May 2004), 8 pages.
VoteHere.net, http://votehere.net/VH-Content-v2.0/platinuminfo.html, 1 page, 1999-2000.
Webvote Inc., Laptop Software for the New Generation of Voting, http://www.webvote-inc.com/laptop.htm, 2 pages, 1999.
David Chaum, "Secret-Ballot Receipts and Transparent Integrity," 14 pages (dated prior to filing date).
Faulkner & Gray, "1998 Advanced Card Technology Sourcebook", 1997, ISBN 1-57987-009-0, pp. 146-154.
AccuVote-TS, http://www.gesn.com/AccuVote-TS/accuvote-ts.html, Global Election Systems, Inc. 4 pages, 2000.
European Patent Office, "*Communication and Supplementary European Search Report*," EP No. 0127 3930.6-2221-US0145769, Mar. 24, 2004, 5 Pages.
International Search Report, PCT/US01/45769, Jan. 6, 2003, 4 Pages.
Bruce Schneier, "Crypto-Gram", http://www.notablesoftware.com/Press/Schneier.html, Dec. 15, 2000, 3 Pages.
Michael Stanton, "The Importance Of Recounting Votes", http://www.notablesoftware.com/Press/electronic_voting_in_brasil.htm, Rio De Janeiro, Brazil, Nov. 13, 2000, 3 Pages.
Peter G. Neumann, "Internet and Electronic Voting", *The Risks Digest*, vol. 21, Issue 14, http://www.notablesoftware.com/Papers/Risks2114.html, Dec. 12, 2000, 3 Pages.
Peter G. Neumann, "Security Criteria For Electronic Voting", http://www.csi.sri.com/users/neumann/nes93.html, Menlo Park, CA, Sep. 20-23, 1993, 3 Pages.
NEDAP Voting System, 4 Pages, © 2000.
Surveys International, *TouchVote*, ACEEEO Conference, "Information Technology in Elections", Warsaw, Poland, 2 Pages Jun. 14-16, 2000.
UniLect Corporation, *The Patriot Voting System*, http://www.unilect.com/patrpack.html, 4 Pages, © 1996.
Hart Interactive, *eSlate Electronic Voting System*, http://www.worldwideelection.com/GoveSlate.cfm, 2 Pages, © 1998-2000.
VoteHere.net, http://votehere.net/VH-Content-v2.0/platinuminfo.html, 1 Page, © 1999-2000.
Webvote Inc., *Laptop Software for the New Generation of Voting*, http://www.webvote-inc.com/laptop.htm, 2 Pages, © 1999.
Catherine Allen and William Barr, "Smart Cards: Seizing Strategic Business Opportunities", 1997, McGraw-Hill, pp. 248-264.
Henry Dreifus and J. Thomas Monk, "Smart Cards: A Guide to Building and Managing Smart Card Applications" 1998, John Wiley and Sons, pp. 139-156.
W. Ranki and Wa. Effing, "Smart Card Handbook" 1997, John Wiley and Sons, pp. 61-97 and 237-272.
Jose Zoreda and Jose Oton, "Smart Cards" 1994, Artec House, Inc., pp. 39-45.
Federal Election Commission, "Performance And Test Standards For Punchcard, Marksense, And Direct Recording Electronic Voting Systems" Jan. 1990, pp. (including i-xvi, 12-19, 28-35, 45-55, C1-C3 and E1-E10).
Alan Dechert, "The Voter Certified Ballot", Granite Bay, CA., http://www.go2zero.com/votereform.html, Feb. 13, 2001, 15 Pages.
Mike McLaughlin, "Voting Receipt", http://catless.ncl.ac.uk/Risks/2.22.html, 1986, 1 Page.
Robert Wright, "Recasting The Voting Process", www.verbusiness.com, Mar. 5, 2001, 4 Pages.
*Diebold Election Systems, Inc.'s Invalidity Contentions for the '944 and '730 Patents, Avante International Technology Corporation*, Plaintiff, v. *Diebold Election Systems, et al*, Defendants; United States Easter District of Missouri Eastern Division: Cause No. 4:06-cv-00978 TCM, Nov. 28, 2006.
*Defendant Election Systems and Software, Inc.'s Preliminary Invalidity Contentions, Avante International Technology Corporation*, Plaintiff, v. *Diebold Election Systems, et al*, Defendants: United States Easter District of Missouri Eastern Division: Cause No. 4:06-cv-00978 TCM, Nov. 30, 2006.
*Sequoia Voting Systems' Preliminary Invalidity Contentions, Avante International Technology Corporation*, Plaintiff, v. *Diebold Election Systems, et al*, Defendants; United States Easter District of Missouri Eastern Division: Cause No. 4:06-cv-00978 TCM, Nov. 28, 2006.
Letter, Paul A. Lesko, (Simons Cooper) to Clement Berard, "*Avante International Technology Corporation* vs. *Diebold Election Software et al*, Cause No. 4:06-cv-00978 TCM" dated Dec. 5, 2006.
Rebecca Mercuri, *Voting-Machine Risks*, Nov. 11, 1992.
*The Risks Digest*, vol. 2, Issue 22, Mar. 1986, 4 pages, includes inter alia: Michael McGlaughlin, *Voting Receipt*, http://catless.ncl.ac.uk/Risks/2.22.html Tom Benson, *Computerized Voting*, http://catless.ncl.ac.uk.Risks/2.22.html.
*The Risks Digest*, vol. 2, Issue 24, Mar. 1986, 4 pages, includes inter alia: Kurt Hyde, *Progress Report on Computerized Voting*, http://catless.ncl.ac.uk/Risks/2.24.html.
*The Risks Digest*, vol. 10, Issue 78, Jan. 1991, 6 pages, includes inter alia: Evan Ravitz, *Voting by Phone*, http://catless.ncl.ac.uk/Risks/10.78.html.
Strini Giorgio, *Data Capture and Processing Device, Particularly For Voting and Associated Polling*, Abstract of IT No. 1234224, Patent for Industrial Invention, Date: May 6, 1992.
Bruce Schneier, *Applied Cryptography*, Second Edition 1996, Cover and title pages, Chapter 6, pp. 125-147, 170-175 185-187 and 587.
Rebecca Mercuri, Physical Verifyability of Computer Systems, *Secure Networks*, Proceedings: Fifth International Computer Virus & Security Conference, 1992, 11 pages.
*The Risks Digests*, vol. 2 Issue 23, Mar. 1986, 5 pages.
*The Risks Digests*, vol. 16, Issue 52, Oct. 1994, 11 pages.
*The Risks Digests*, vol. 21, Issue 10, Nov. 7, 2000, 10 pages.
*The Risks Digests*, vol. 22, Issue 66, Apr. 1, 2003, 11 pages.
*The Risks Digests*, vol. 22, Issue 54, Feb. 3, 2003, 11 pages.
Holli Riebeek, "Brazil Holds All-Electronic National Election", Oct. 15, 2002, 1 page.
Mike He, Rogerio Almeida and Edson Gissoni, "National Semiconductor and Unisys Equip Brazil with New Voting Machines for Fast and Accurate Election Results in the Fall", National Semiconductor, http://www.national.com/news/item/0,735,757,00.html, May 6, 2002, 3 pages.
Rebecca Mercuri, "A Better Ballot Box?", IEEE Spectrum, Oct. 2002, pp. 46-50.
Peter G. Neumann, "Security Criteria for Electronic Voting", http://www.csl.sri.com/users/neumann/ncs93.html, c 1993, 7 pages.
E-mail message from: R. Mercuri [notable@mindspring.com] To: Clement Berard; plesko @simmonscooper.com, "Avante Patent 7036730 and infringement suit", Jul. 13, 2006, 4 pages.
Rebecca Mercuri, "Electronic Voting", http://web.archive.org/web20010201193800/http://www.notablesoftware.com/; updated Jan. 28, 2001; 11 pages.
Bruce Schneier, Crypto-Gram Newsletter, Dec. 15, 2000, http://www.counterpane.com; 17 pages (copy from www.schneier.com/crypto-gram-0012.html).
Rebecca Mercuri, Explanation of Voter-Verified Ballot Systems, The Risks Digest, ACM Comm. on Computers & Public Policy, vol. 22: 17, Jul. 24, 2002, 15:54-47-0400, 2 pages.
Yahoo Finance, Press Release, Inventor of Electronic Voting Verification System Takes Industry Giants to Court for Patent Infringement; Wed., Jul. 12, 2006 11:19 am, 2 pages.
Rebecca Mercuri, "Why Computers Shouldn't Count Votes", Princeton ACM/IEEE Computer Society Chapters, Nov. 2000 Joint Meeting, Thurs. Nov. 16, 2000, 8:00 pm, 2 pages.
Douglas Dixon, Technology & The Polls: Rebecca Mercuri, Nov. 15, 2000 U.S. 1 Newspaper, Princeton1info.com, http://notablesoftware.com/Press/dixon.html, 7 pages.

Rebecca Mercuri, "Electronic Vote Tabulation Checks & Balances", Dissertation, 2001, Presented to Faculty of Univ. of Pennsylvania, 235 pages.

R. Mercuri, The FEC Proposed Voting Systems Standard Update, A Detailed Comment, Submitted to Fed. Election Commission, Sep. 10, 2001, FEC Not 2001-9. vol. 66, No. 132, 8 pages.

Terri Gauchat, [Abstract] Computer Assisted Vote Tallying, An Overview of the Problems, Implications, and Solutions, Univ. of Waterloo, Term Res Project, Apr. 11, 1991, 14 pages.

Ltr. to Paul Lesko, Esq. Jun. 28, 2006, Re: U.S. Appl. No. 10/255,348, "Electronic Voting Apparatus, System and Method", From Nancy L. Reeves, Walker & Jocke, 5 pages.

Document submitted to Patent Office, Archive Date Jul. 11, 2000, ACCUVote-TS, http://web.archive.org/web/20000711160152/www.globalelection.com., 5 pages.

AccuVote TS reference, Archive Date Oct. 12, 1999, http://web.archive.org/web/19991012074217/www.gesn.com/Product..., 3 pages.

Roy G. Saltman, Accuracy, Integrity, and Security in Computerized Vote-Tallying, Computer Science & Technology, NBS Special Pub. 500-158, Aug. 1998, 109 pages.

Michael Ian Shamos, CFP'93-Electronic Voting-Evaluating the Threat, Mar. 1993, CPSR, http://web.archive.org/web20011224071421/www.cpsr.org/conference.., 9 pages.

Description of AccuVote OS, Archived Oct. 12, 1999, "The AccuVote" http://web.archive.org/web/19991012093810/www.gesn.com/Product. 3 pages.

Description of GEMS, Archived Nov. 9, 1999, "Global Election Management System," http://web.archive.org/web/19991109003219/www.gesn.com/Product.. 4 pages.

Excerpts from current AccuVote TSX Pollworker's Guide, AccuVote-TSX Pollworker's Guide, Diebold Election Systems, Revision 5.0, Mar. 22, 2005, 3 pages.

CALTECH-MIT, "Voting What is What Could Be", Jul. 2001, 95 pages.

Rebecca Mercuri, "Rebecca Mercuri's Statement on Electronic Voting", http://www.notablesoftware.com/RMstatement.html, Copyright c2001, 2 pages.

Rebecca Mercuri, "Electronic Voting", http://www.notablesoftware.com/evote.html, Oct. 15, 2001, 8 pages.

Bruce Schneier, "Voting and Technology," from Crypto-Gram Newsletter, Dec. 15, 2000, http://www.notablesoftware.com/press/schneier.html; 3 pages.

CJvK Translation 10206 It:Eng Patent Application No. 1234224; prepared May 6, 1992; 22 pages.

A. Riera, J. Borrell, J. Rifa, "An uncoercible verifiable electronic voting protocol," Proceedings of IFIP SEC '98, Online, Sep. 4, 1998, XP002272039, 10 Pages.

D. Dill, R. Mercuri, P. Neumann, D. Wallach, "Frequently Asked Questions about DRE Voting Systems", http://www.verifiedvoting.org/drefaq.asp, printed Aug. 24, 2004, 7 pages.

The Open Voting Consortium, "Frequently Asked Questions (FAQ)", © 2004 http://www.openvotingconsortium.org/faq.html, printed Aug. 24, 2004, 17 pages.

Verified Voting Foundation, "E-Voting Misconceptions", http://www.verifiedvoting.org/article.asp?id+2609, printed Aug. 24, 2004, 3 pages.

A. Dechert, "Statement at Utah State Capital", Jul. 13, 2004, http://www.openvotingconsortium.org/ad/alan-ut-7-13.html, printed Aug. 24, 2004, 2 pages.

M. Shamos, "Paper v. Electronic Voting Records—An Assessment", Apr. 2004, http://euro.ecom.cmu.edu/people/faculty/mshamos/paper.htm, printed Aug. 24, 2004, 20 pages.

A. Dechert, "OVC Response to Paper v. Electronic Voting Records—An Assessment, by Michael Ian Shamos", Jul. 30, 3004, http://gnosis.python-hosting.com/voting-project/July.2004/0240.html, printed Aug. 24, 2004, 6 pages.

K. Zetter, "California Bans E-Vote Machines", Apr. 30, 2004, http://www.wirednew.com/news/evote/0,2645,63298,00.html?tw=wn_story_page_prev2, printed Jun. 22, 2004, 3 pages.

Associated Press "Prototype E-Vote Printer Fails to Satisfy", © 2005, Feb. 3, 2005, 2 pages, http://start.earthlink.net/channel/news/print?guid=20050203/4201afd0_3ca6_15526200502...

R. Mercuri, "Computer Security Act and Computerized Voting Systems", Nov. 27, 1992, Risks Digest vol. 14: Issue 11, pp. 3-4.

Westinghouse DataScore Systems, "Optical Mark Reader Systems", no date marked; prior to Mar. 30, 2007; 13 pages.

Tallone, "Business Point of View: A Better Voting System", ca. 2004, 2 pages.

Election Systems & Software, "Integrated Hardware Solutions", © 2001 (on last sheet, but date "Oct. 6, 2004" on sheet AV-17423), 14 pages.

National Computer Systems, "Precept Image System", © 1991 or 1992, 10 pages.

*The Risk Digest*, vol. 21: Issue 23; Jan. 30, 2001; 12 pages.

*Defendants' Preliminary Claim Construction and Preliminary Identification of Extrinsic Evidence, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 3 pages.

*Defendants' Proposed Construction For 730 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 23 pages.

*Defendants' Proposed Construction For '944 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 17 pages.

*Defendants' Proposed Construction For '313 Patent, Avante International Technology Corporation*, Plaintiff, v. *Diebold Election Systems, et al*, Defendants; United States Easter District of Missouri Eastern Division: Cause No. 4:06-cv-00978 TCM, Apr. 17, 2007, 6 pages.

*Joint Claim Construction and Prehearing Statement, Avante International Technology Corporation*, Plaintiff, v. *Diebold Election Systems, et al*, Defendants; United States Easter District of Missouri Eastern Division: Cause No. 4:06-cv-00978 TCM, Apr. 24, 2007, 63 pages.

*Defendants' Initial Claim Construction Brief, Avante International Technology Corporation*, Plaintiff, v. *Diebold Election Systems, et al*, Defendants; United States Easter District of Missouri Eastern Division: Cause No. 4:06-cv-00978 TCM, May 8, 2007, 245 pages.

"*Motion for Leave to File Amended Counterclaim" and "Amended Answer and Counterclaim of Diebold Election Systems", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 40 pages.

"*Defendant Election Systems & Software, Inc's Motion for Leave to File First Amended Answer to Plaintiff's Third Amended Complaint and Memorandum of Law in Support of Motion" and "First Amended Answer of Election Systems & Software, Inc. To Plaintiff's Third Amended Complaint and Amended Counterclaim of Election Systems & Software, Inc.", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 30 pg.

"*Defendant Sequoia Voting Systems' Motion for Leave to Amend Its Answer, Affirmative Defenses and Counterclaims to State Additional Facts Supporting Its Counterclaim For Inequitable Conduct" and "Amended Answer, Affirmative Defenses and Counterclaims of Sequoia Voting Systems", Avante International Technology Corporation*, Plaintiff, v. *Diebold Election Systems, et al*, Defendants; United States Easter District of Missouri Eastern Division: Cause No. 4:06-cv-00978 TCM, May 14, 2007, 35 pages.

*Defendants' Response to Plaintiff Avante's Claim Construction Brief, Avante International Technology Corporation*, Plaintiff, v. *Diebold Election Systems, et al*, Defendants; United States Easter District of Missouri Eastern Division: Cause No. 4:06-cv-00978 TCM, May 21, 2007, 64 pg.

Global Election Systems, Inc., "AccuVote-TS", http://www.archive.org/web/20000830141622/http:/www.gesn.com/AccuVote-TS/accuvot..., Web Archive date Aug. 30, 2000, 4 pages.

VoteHere, Inc., "November Election in Arizona and California will be first-ever cooperative trial of online voting", "VoteHere Platinum" and "VoteHere Gold", http://web.archive.org/web/20001019071003/votehere.net/VH-Content-v2.0/default.htm, Web Archive date Oct. 19, 2000, 5 pages.
Diebold Election Systems, "Election Solutions Diebold Election Systems Solutions", "Election Solutions AccuVote-TS", "Election Solutions AccuVote-OS", and "Election Solutions Global Election Management System—GEMS", http://web.archive.org/web/20020811050628/www.diebold.com/solutions/election/solutio..., Web Archive date Oct. 3, 2002, 10 pages.
Peripheral Dynamics, Inc., "PAGESCAN II", no date marked; prior to Mar. 29, 2007; 2 pages.
Avante International Technology, Inc., "Optical Vote-Trakker: A "Mark-Sense" Absentee & Precinct-Based Voting System that Minimizes Both Voter and System Errors", Jan. 2004, 7pg.
European Patent Office, "Communication Pursuant to Article 96(2) EPC", Application No. 01273930.6, May 8, 2004, 10 pages.
European Patent Office, "Communication Pursuant to Article 96(2) EPC", Application No. 01273930.6, Jun. 20, 2005, 10 pages.
European Patent Office, Communication, Application No. 01273930.6, Oct. 15, 2004, 8 pages.
D. Dixon, "Technology & the Polls: Rebecca Mercuri", Nov. 15, 2000, 8 pages.
U.S. Appl. No. 60/458,961, filed Apr. 1, 2003, entitled "An Improved Voting Machine" by Homewood et al., 23 pages.
Internet Archive Wayback Machine, VoteHere.net, The Secure Internet Voting Company, http://web.archive.org/web/*/http"//votehere, allegedly Oct. 19, 2000, printed May 8, 2007, pp. HL00068-HL00092.
Avante International Technology, Inc., "Optical VOTE-TRAKKER™: A "Mark-Sense" Absentee & Precinct Based Voting System that Minimizes Both Voter and System Errors", link available at http://www.vote-trakker.com/optical.html, Jan. 2004, 10 pages.
Avante International Technology, Inc., "Avante Optical VOTE-TRAKKER™", © 2001-2004, printed Jun. 11, 2007, 2 pages.
Avante International Technology, Inc., "Avante VOTE-TRAKKER™"and "Avante VOTE-TRAKKER™ Overview", Mar. 16, 2004, printed Jun. 11, 2007, 6 pages.
Avante International Technology, Inc., "Avante VOTE-TRAKKER™ EVC308-SPR" and "Avante VOTE-TRAKKER™ EVC308-SPR-FF", © 2001-2004, printed Jun. 11, 2007, 6 pages.
Avante International Technology, Inc., "Accessible Voting Integrating the Touch-Screen Accessibility of DRE System with the Optical Scanning Paper Ballots", © 2001-2004, certain parts updated Mar. 16, 2004, Apr. 8, 2004 and May 18, 2004, printed Jun. 11, 2007, 17 pages.
Federal Election Commission, "Voting Systems Performance and Test Standards" Overview and vols. I & II, 2002, 307 pages.
*Diebold Election Systems's Motion for Summary Judgement of Non-Infringement of U.S. Patent No. 7,036,730, Avante International Technology Corporation*, Plaintiff, v. *Diebold Election Systems, et al*, Defendants; United States Easter District of Missouri Eastern Division: Cause No. 4:06-cv-00978 TCM, Feb. 5, 2007, 3 pages.
*Memorandum in Support of Diebold Election Systems's Motion for Summary Judgement of Non-Infringement of U.S. Patent No. 7,036,730, Avante International Technology Corporation*, Plaintiff, v. *Diebold Election Systems, et al*, Defendants; United States Easter District of Missouri Eastern Division: Cause No. 4:06-cv-00978 TCM, Feb. 5, 2007, 22 pages.
*Statement of Uncontroverted Material Facts in Support of Diebold Election Systems's Motion for Summary Judgement of Non-Infringement of U.S. Patent No. 7,036,730, Avante International Technology Corporation*, Plaintiff, v. *Diebold Election Systems, et al*, Defendants; United States Easter District of Missouri Eastern Division: Cause No. 4:06-cv-00978 TCM, Feb. 5, 2007, 77 pages.
*Diebold Election Systems' Motion for Summary Judgment of Non-Infringement of U.S. Patent No. 7,036,730, Avante International Technology Corporation*, Plaintiff v. *Diebold Election Systems, et al*, Defendants; United States Easter District of Missouri Eastern Division: Cause No. 4:06-cv-00978 TCM, Feb. 5, 2007, 3 pages.
*Memorandum in Support of Diebold Election Systems' Motion For Summary Judgment of Non-Infringement of U.S. Patent No. 7,036,730, Avante International Technology Corporation*, Plaintiff v. *Diebold Election Systems, et al*, Defendants; United States Easter District of Missouri Eastern Division: Cause No. 4:06-cv-00978 TCM, Feb. 5, 2007, 22 pages.
*Statement of Uncontroverted Material Facts In Support of Diebold Election Systems' Motion For Summary Judgment of Non-Infringement of U.S. Patent No. 7,036,730 (with Exhibits), Avante International Technology Corporation*, Plaintiff v. *Diebold Election Systems, et al*, Defendants; United States Easter District of Missouri Eastern Division: Cause No. 4:06-cv-00978 TCM, Feb. 5, 2007, 77 pages.
*Reply Brief in Support of Defendant Diebold Election Systems' Motion For Summary Judgment of Non-Infringement of U.S. Patent No. 7,036,730, Avante International Technology Corporation*, Plaintiff v. *Diebold Election Systems, et al*, Defendants; United States Easter District of Missouri Eastern Division: Cause No. 4:06-cv-00978 TCM, Aug. 16, 2007, 10 pages.
*Avante International Technology Corporation's Motion for Leave to File A Sur-Reply In Support of Its Opposition to Diebold's Motion For Summary Judgment, Avante International Technology Corporation*, Plaintiff v. *Diebold Election Systems, et al*, Defendants; United States Easter District of Missouri Eastern Division: Cause No. 4:06-cv-00978 TCM, Aug. 21, 2007, 5 pages.
*Avante's Sur-Reply In Support of Its Opposition to Diebold's Motion For Summary Judgment, Avante International Technology Corporation*, Plaintiff v. *Diebold Election Systems, et al*, Defendants; United States Easter District of Missouri Eastern Division: Cause No. 4:06-cv-00978 TCM, Aug. 27, 2007, 7 pages.
*Memorandum and Order on Claim Construction, Avante International Technology Corporation*, Plaintiff v. *Diebold Election Systems, et al*, Defendants; United States Easter District of Missouri Eastern Division: Cause No. 4:06-cv-00978 TCM, Aug. 20, 2007, 50 pages.
*Defendant Hart Intercivic, Inc.'s Preliminary Invalidity Contentions for U.S. Patent Nos. 6,892,944, 7,036,730, and 7,077,313, Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJP, Sep. 10, 2007, 49 pages.
*Content Listing of Hart Intercivic's Invalidity Contentions, Exhibit F (disk), Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJP, Sep. 10, 2007, 3 pages.
Ramin Safari-Foroushani, "Form Registration: A Computer Vision Approach", © 1997, 121 pages.
Ashraf Nasr Sayed, "Extraction and Photogrammetric Exploitation of Features in Digital Images", Aug. 1990, 263 pages.
Granite Creek Technology Incorporated, "Certification Tests of OPSCAN 5/TeamWork Electronic Voting System", Dec. 15, 1993, 10 pages.
Granite Creek Technology Incorporated, "Certification Tests of OPTECH IV-C Model 400 Central Ballot Tabulator", Jul. 7, 1992, 14 pages.
"OPTECH IV-C Central Ballot Counter Operator's Manual", Jul. 29, 1990, 46 pages.
Sequoia Voting Systems' Updated Invalidity Contentions, *Avante International Technology Corporation*, Plaintiff, v. *Premier Election Solutions*, et al, Defendants: United States Eastern District of Missouri Eastern Division: Case No. 4:06-cv-00978 TCM, Oct. 22, 2007, 42 pages.
Premier Election Solution, Inc.'s Invalidity Contentions for the '944 and '313 Patents, *Avante International Technology Corporation*, Plaintiff, v. *Premier Election Solutions*, et al, Defendants; United States Eastern District of Missouri Eastern Division: Case No. 4:06-cv-00978 TCM, Oct. 23, 2007, 39 pages.
Defendant Election Systems & Software, Inc.'s Updated Invalidity Contentions, *Avante International Technology Corporation*, Plaintiff, v. *Premier Election Solutions*, et al, Defendants; United States Eastern District of Missouri Eastern Division: Case No. 4:06-cv-00978 TCM, Oct. 22, 2007, 32 pages.

Defendant's Premier Election Solutions, Inc. and Election Systems & Software, Inc.'s Memorandum of Law in Support of its Motion for Summary Judgement of Non-Infringement on Claims 26-28, 30 and 49-51 of U.S. Pat. No. 6,892,944, *Avante International Technology Corporation*, Plaintiff, v. *Premier Election Solutions*, et al, Defendants; United States Eastern District of Missouri Eastern Division: Case No. 4:06-cv-00978 TCM, Nov. 2, 2007, 14 pages.

Memorandum in Support of Defendants' Joint Motion for Summary Judgement of Invalidity of Claims 26-28, 30 and 49-51 of U.S. Pat. No. 6,892,944, *Avante International Technology Corporation*, Plaintiff, v. *Premier Election Solutions*, et al, Defendants; United States Eastern District of Missouri Eastern Division: Case No. 4:06-cv-00978 TCM, Nov. 2, 2007, 20 pages.

Memorandum in Support of Defendants' Joint Motion for Summary Judgement of Invalidity of the Asserted Claims from U.S. Pat. Nos. 6,892,944 and 7,077,313 Under 35 U.S.C. §§ 102 and 103, *Avante International Technology Corporation*, Plaintiff, v. *Premier Election Solutions*, et al, Defendants; United States Eastern District of Missouri Eastern Division: Canuse No. 4:06-cv-00978 TCM, Nov. 2, 2007, 26 pages.

Statement of Uncontroverted Materials Facts in Supported of Defendants' Joint Motion for Summary Judgment that U.S. Pat. Nos. 6,892,944 and 7,077,313 are Invalid Under 35 U.S.C. §§ 102 and 103, *Avante International Technology Corporation*, Plaintiff, v. *Premier Election Solutions*, et al, Defendants; United States Eastern District of Missouri Eastern Division: Case No. 4:06-cv-00978 TCM, Nov. 2, 2007, 192 pages.

Roy G. Saltman, "Effective Use of Computing Technology in Vote-Tallying", Mar. 1975, 139 pgs.

Douglas Jones, "A Brief Illustrated History of Voting", 2001, 18 pages.

North American Professional Technologies, "Vote Tally System Ballot Production Guide", Jun. 1989, 16 pages.

Michael I. Shamos, "American Information Systems, AIS 115 and 315 Vote Tabulation Systems, An Evaluation", Dec. 1989, 9 pages.

Michael I. Shamos, "American Information Systems, AIS 150 and 550 Mark-Sense Vote Tabulation Systems and Election Reporting System (ERS), An Evaluation", Mar. 1994, 5 pages.

Michael I. Shamos, "Business Records Corporation, Optech IV-C Model 200 Mark-Sense Central Tabulation Unit, An Evaluation", Nov. 1991, 8 pages.

Michael I. Shamos, "American Information Systems, AIS 315 Ballot Counter, An Evaluation", Nov. 1983, 5 pages.

Michael I. Shamos, "The Sequoia Pacific Datavote System, An Evaluation", Jun. 1984, 7 pages.

Statement of Uncontroverted Material Facts in Support of Defendants' Election Systems and Software Inc. and Premier Election Solutions, Inc.'s Motion for Summary Judgment of Non-Infringement of Claims 26-28, 30 and 49-51 of U.S. Pat No. 6,892,944, *Avante International Technology Corporation*, Plaintiff, v. *Premier Election Solutions*, et al, Defendants; United States Eastern District of Missouri Eastern Division: Case No. 4:06CV00978 TCM, Nov. 2, 2007, 29 pages.

Statement of Uncontroverted Material Facts in Support of Defendants' Joint Motion for Summary Judgment of Invalidity of Claims 26-28, 30 and 49-51 of U.S. Pat No. 6,892,944, *Avante International Technology Corporation*, Plaintiff, v. *Premier Election Solutions*, et al, Defendants; United States Eastern District of Missouri Eastern Division: Case No. 4:06CV00978 TCM, Nov. 2, 2007, 95 pages.

Motion for Summary Judgment of Invalidity of the Asserted Claims from U.S. Pat Nos. 6,892,944, and 7,077,313 Under 35 U.S.C. §§ 102 and 103, *Avante International Technology Corporation*, Plaintiff, v. *Premier Election Solutions*, et al, Defendants; United States Eastern District of Missouri Eastern Division: Case No. 4:06CV00978 TCM, Nov. 2, 2007, 3 pages.

Declaration of Michael I. Shamos, Ph.D., J.D. in Support of Defendants' Joint Motion for Summary Judgment that U.S. Pat Nos. 6,892,944, and 7,077,313 are Invalid Under 35 U.S.C. §§ 102(b) and 103(a), *Avante International Technology Corporation*, Plaintiff, v. *Premier Election Solutions*, et al, Defendants; United States Eastern District of Missouri Eastern Division: Case No. 4:06CV00978 TCM, Nov. 2, 2007, 332 pages.

Plaintiff Avante International Technology, Corporation's Memorandum in Opposition to Defendants' Joint Motion for Summary Judgment of Invalidity of Claims 26-28, 30 and 49-51 of U.S. Pat No. 6,892,944, *Avante International Technology Corporation*, Plaintiff, v. *Premier Election Solutions*, et al, Defendants; United States Eastern District of Missouri Eastern Division: Case No. 4:06CV00978 TCM, Dec. 14, 2007, 180 pages.

Defendants' Response to Plaintiff Avante International Technology Corporation's Statement of Uncontroverted Facts in Supported of its Motion for Summary Judgment that U.S. Pat. Nos. 6,892,944 and 7,077,313 are not Invalid, in View of Defendants' References or 35 U.S.C. § 112 Arguments, *Avante International Technology Corporation*, Plaintiff, v. *Premier Election Solutions*, et al, Defendants; United States Eastern District of Missouri Eastern Division: Case No. 4:06CV00978 TCM, Dec. 14, 2007, 90 pages.

Premier Voting Solutions, Inc.'s Memoradum in Opposition to Avante International Technology Corporation's Motion for Summary Judgment that Premier Election Solutions, Inc.'s Equipment Infringes U.S. Pat. Nos. 6,892,944 and 7,077,313, *Avante International Technology Corporation*, Plaintiff, v. *Premier Election Solutions*, et al, Defendants; United States Eastern District of Missouri Eastern Division: Case No. 4:06CV00978 TCM, Dec. 14, 2007, 10 pages.

Sequoia Voting Systems' Opposition to Plaintiff's Motion for Summary Judgment that Sequoia's Equipment Infringes U.S. Pat. Nos. 6,892,944 and 7,077,313, *Avante International Technology Corporation*, Plaintiff, v. *Premier Election Solutions*, et al, Defendants; United States Eastern District of Missouri Eastern Division: Case No. 4:06CV00978 TCM, Jan. 9, 2008, 151 pg.

Avante International Technology Corporation's Reply in Support of its Motion for Summary Judgment that Diebold Election Systems, Inc.'s Equipment Infringes U.S. Patent Nos. 6,892,944 and 7,077,313, *Avante International Technology Corporation*, Plaintiff, v. *Premier Election Solutions*, et al, Defendants; United States Eastern District of Missouri Eastern Division: Case No. 4:06CV00978 TCM, Jan. 11, 2008, 14 pages.

Defendants' Reply in Support of Their Joint Motion for Summary Judgment of Invalidity of Claims 26-28, 30 and 49-51 of U.S. Pat. No. 6,892,944 Based on 35 U.S.C. § 112 ¶ 1, *Avante International Technology Corporation*, Plaintiff, v. *Premier Election Solutions*, et al, Defendants; United States Eastern District of Missouri Eastern Division: Case No. 4:06CV00978 TCM, Jan. 11, 2008, 101 pages.

Defendants Premier Election Solutions, Inc. and Election Systems & Software, Inc.'s Reply in Support of Their Joint Motion for Summary Judgment of Non-Infringement of Claims 26-28, 30 and 49-51 of U.S. Pat. No. 6,892,944, *Avante International Technology Corporation*, Plaintiff, v. *Premier Election Solutions*, et al, Defendants; United States Eastern District of Missouri Eastern Division: Case No. 4:06CV00978 TCM, Jan. 11, 2008, 17 pages.

Michael I. Shamos, "Shoup Corporation, Shouptronic Direct Recording Electronic Voting System, An Evaluation", Jul. 1991, 3 pages.

Defendant Hart Intercivic, Inc.'s Response to Plaintiff's Claim Construction Brief for U.S. Pat. Nos. 6,892,944, 7,036,730, and 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Feb. 1, 2008, 304 pgs.

Avante International Technology, Inc.'s Reply in Support of its Claim Construction Brief for U.S. Pat. Nos. 6,892,944, 7,036,730, and 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Feb. 8, 2008, 71 pgs.

Avante International Technology, Inc.'s Claim Construction Brief for U.S. Pat Nos. 6,892,944, 7,036,730, and 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Jan. 18, 2008, 364 pgs.

Declaration of Peter G. Martin Filed in Support of Defendants' Joint Motion for Summary Judgment of Invalidity of the Asserted Claims from U.S. Pat. Nos. 6,892,944 and 7,077,313 Under 35 U.S.C. §§ 102 and 103, *Avante International Technology Corporation*, Plaintiff, v.

*Premier Election Solutions*, et al, Defendants; United States Eastern District of Missouri Eastern Division: Case No. 4:06CV00978 TCM, Nov. 2, 2007, 105 pages.
Defendants' Memorandum in Opposition to Avante International Technology Corporation's Motion for Summary Judgment that U.S. Pat. Nos. 6,892,944 and 7,077,313 Are Not Invalid in View of Defendants' References or 35 U.S.C. § 112 Arguments, *Avante International Technology Corporation*, Plaintiff, v. *Premier Election Solutions,* et al, Defendants; United States Eastern District of Missouri Eastern Division: Case No. 4:06CV00978 TCM, Dec. 14, 2007, 199 pages.
Defendant Premier Voting Solutions, Inc.'s Response to Statement of Uncontroverted Facts in Support of Avante International Technology Corporation's Motion for Summary Judgment that Premier Voting Solutions, Inc. Equipment Infringes U.S. Pat. Nos. 6,892,944 and 7,077,313, AND Additional Facts in Support of its Opposition to Avante's Motion for Summary Judgement, *Avante International Technology Corporation*, Plaintiff, v. *Premier Voting Solutions, Inc.*, et al, Defendants; United States Eastern District of Missouri Eastern Division: Case No. 4:06CV00978 TCM, Dec. 15, 2007, 197 pages.
Defendants' Response to Avante International Technology Corporation's Statement of Material Facts in Support of its Opposition to Defendants' Joint Motion for Summary Judgment That U.S. Pat. Nos. 6,892,944 and 7,077,313 Are Invalid Under 35 U.S.C. §§ 102 and 103, *Avante International Technology Corporation*, Plaintiff, v. *Premier Election Solutions*, et al, Defendants; United States Eastern District of Missouri Eastern Division: Case No. 4:06CV00978 TCM, Jan. 11, 2008, 68 pages.
Defendants' Reply in Support of Their Joint Motion for Summary Judgment of Invalidity of the Asserted Claims From U.S. Pat. Nos. 6,892,944 and 7,077,313 Are Invalid Under 35 U.S.C. §§ 102 and 103, *Avante International Technology Corporation*, Plaintiff, v. *Premier Election Solutions*, et al, Defendants; United States Eastern District of Missouri Eastern Division: Case No. 4:06CV00978 TCM, Jan. 11, 2008, 66 pages.
Notice of Allowance of U.S. Appl. No. 11/709,449 which has Bearing on Pending Summary Judgment Motions, *Avante International Technology Corporation*, Plaintiff, v. *Premier Voting Solutions*, et al, Defendants; United States Eastern District of Missouri Eastern Division: Case No. 4:06CV00978 TCM, Mar. 18, 2008, 4 pages.
Defendants' Memorandum Regarding Plaintiff's Notice, *Avante International Technology Corporation*, Plaintiff, v. *Premier Voting Solutions*, et al, Defendants; United States Eastern District of Missouri Eastern Division: Case No. 4:06CV00978 TCM, Mar. 24, 2008, 6 pages.
Avante's Response to Defendant's Memorandum, *Avante International Technology Corporation*, Plaintiff, v. *Premier Voting Solutions*, et al, Defendants; United States Eastern District of Missouri Eastern Division: Case No. 4:06CV00978 TCM, Mar. 26, 2008, 3 pages.
Defendant's Supplemental Responses and Objections to Plaintiff's First Requests for Admission, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Jun. 4, 2008, 6 pgs.
Defendant's Supplemental Responses to Plaintiff's First Set of Interrogatories, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Jun. 4, 2008, 88 pgs.

* cited by examiner

ELECTRONIC VOTING APPARATUS, SYSTEM AND METHOD

This Application is a continuing Application from co-pending U.S. patent application Ser. No. 09/737,306 filed on Dec. 15, 2000 now U.S. Pat No. 7,036,730, which claims the benefit of U.S. Provisional Application No. 60/252,012 filed Nov. 20, 2000, of U.S. Provisional Application No. 60/253,480 filed Nov. 28, 2000, of U.S. Provisional Application No. 60/253,778 filed Nov. 29, 2000, of U.S. Provisional Application No. 60/250,178 filed Nov. 30, 2000, and of U.S. Provisional Application No. 60/251,920 filed Dec. 7, 2000, and this Application hereby claims the benefit of each of the foregoing Applications.

The present invention relates to voting apparatus, systems and methods and, in particular, to electronic voting apparatus, systems and methods providing confirmation of voting selections.

BACKGROUND

Current election processes using paper cards and/or ballots have been subject of controversy because of questions concerning their accuracy, potential for voter confusion, and potential for fraud. This is true for machine voting as well as for hand-marked ballots or punch card ("chad" or "chip" removal type) ballots, whether counted by optical scanning or mechanical scanning, which introduce the additional difficulty of determining what is and is not a voted ballot due to incomplete or partial marking of a box or spot or due to the partial or incomplete punching out of a chad or chip. The accuracy and integrity of the voting process and of the counting of ballots is of great concern in any election. As is perhaps most convincingly evidenced by the events surrounding the United States Presidential Election for the year 2000, and particularly in the State of Florida, the lack or perceived lack of accuracy and integrity can cause fear, doubt, distrust and divisiveness and can undermine confidence in government and its institutions.

While some of the foregoing is alleviated by conventional mechanical and more recently by computer-based electronic voting machines utilizing proven and applicable means of data entry such as special keyboards or touch-screens that have been constructed for conventional electronic voting machines, these do not allow or provide any way for personal checking of votes cast to increase the voter's confidence. While the use of computers for vote tabulation and record keeping for each voting machine and/or election can be done with almost zero error, voter confidence in the process is still a subject to be considered. A particular concern relates to the nature of records stored in electronic and magnetic form which are intangible and can be changed without leaving any evidence thereof.

In addition to potential machine and human error, present election and ballot systems do not provide any traceable record for the election choices of individual voters. While the secrecy of each personal ballot is important for various reasons and must be maintained, a voting system and method that would provide confirmation of his or her voting choice(s) to each individual voter and that would further allow the individual voter to compare what has been tallied during the election as his vote to such confirmation would be extremely useful and increase confidence in the integrity and accuracy of the outcome of the voting.

The following cannot be easily addressed to eliminate potential human error and the possibilities for mischief or tampering with conventional voting systems and methods:

1. Voter registration verification when the voter shows up at the polls to vote may be very strict or may be loose, without any uniform or satisfactory standard. Conventional systems simply lack any simple means to verify registration electronically and instantly before the voter is allowed to vote. This lack of certainty is magnified in the case of "provisional" ballots, as well as in the case of "domestic absentee" and "overseas absentee" ballots, particularly when such ballots are challenged.
2. The voter does not have any record of his voting selections. There is currently no sure way to allow the voter to verify and have confidence that the vote he/she cast has indeed been tallied properly.
3. If an electronic voting booth is used, there is no feasible way to challenge or recount the voting records since the votes are accumulated electronically in electronic memories and, if stored as individual records, are stored in a random order to preserve voter anonymity. Voting machines, and particularly electronic voting machines wherein an intangible electronic or magnetic record may be altered (either intentionally or accidentally) without any telltale evidence thereof, must be totally devoid of possible tampering or other problem in order that the confidence of the voting public and of each individual voter can be preserved.

In view of the recent problems and issues in properly and accurately counting votes in the U.S. Presidential election, voters are likely asking questions such as:

How do you know that your paper, electronic, or mechanical ballot or vote was actually counted? And that it was counted correctly?

Are you comfortable that multiple voting (i.e. the old saying, "Vote early! Vote often!") has really been eliminated?

Are you sure that your absentee ballot or overseas absentee ballot was counted? And that it was counted correctly?

Are you sure that provisional ballots are properly verified and qualified, and then are counted correctly?

Can you be sure that the vote count in extremely close election, e.g., an election where the difference is a mere hundreds of votes out of many millions of votes cast or one or two votes out of several thousands of votes cast, is really correct and legitimate?

It would be desirable to have a voting apparatus, system and method that could substantially eliminate doubts and fears, whether real or imagined, concerning the accuracy and integrity of the voting apparatus, system and method. People who are among those that do not or cannot trust a voting machine or system completely, whether it utilize an electronic or mechanical voting machine, or marked or punched paper ballots, would be more likely to trust the voting system if it was "transparent," i.e. if the voting system provided a way for each individual vote to be independently verified. Of course, transparency should be provided without compromising the secrecy of any individual vote or the confidentiality of the voting booth.

Accordingly, there is a need for a voting apparatus, system and method that provides confirmation and/or verification of the voting selections made.

To this end, a voting system providing a printed confirmation of voting selections made comprises: means for initiating a voting session; a voter interface for receiving voting selections made during the voting session; a processor for creating a voting record including the voting selections made during the voting session; a memory coupled to the processor for storing the voting record including the voting selections made during the voting session; a printer for storing the voting record including the voting selections made during the voting session on a printed paper, wherein the printed paper is human readable, optically readable, or both human and optically readable; and means for providing the printed paper for verifying the voting selections made during the voting session that are printed on the printed paper.

According to another aspect, a method for voting providing a printed confirmation of voting selections made comprises the steps of:

initiating a voting session;

creating a voting record including voting selections made during the voting session;

storing the voting record including the voting selections made during the voting session in a memory;

storing the voting record including the voting selections made during the voting session on a printed paper, wherein the printed paper is human readable, optically readable, or both human and optically readable; and providing the printed paper for verifying the voting selections made during the voting session that are printed on the printed paper.

BRIEF DESCRIPTION OF THE DRAWING

The detailed description of the preferred embodiments of the present invention will be more easily and better understood when read in conjunction with the FIGURES of the Drawing which include.

Figure 1A:
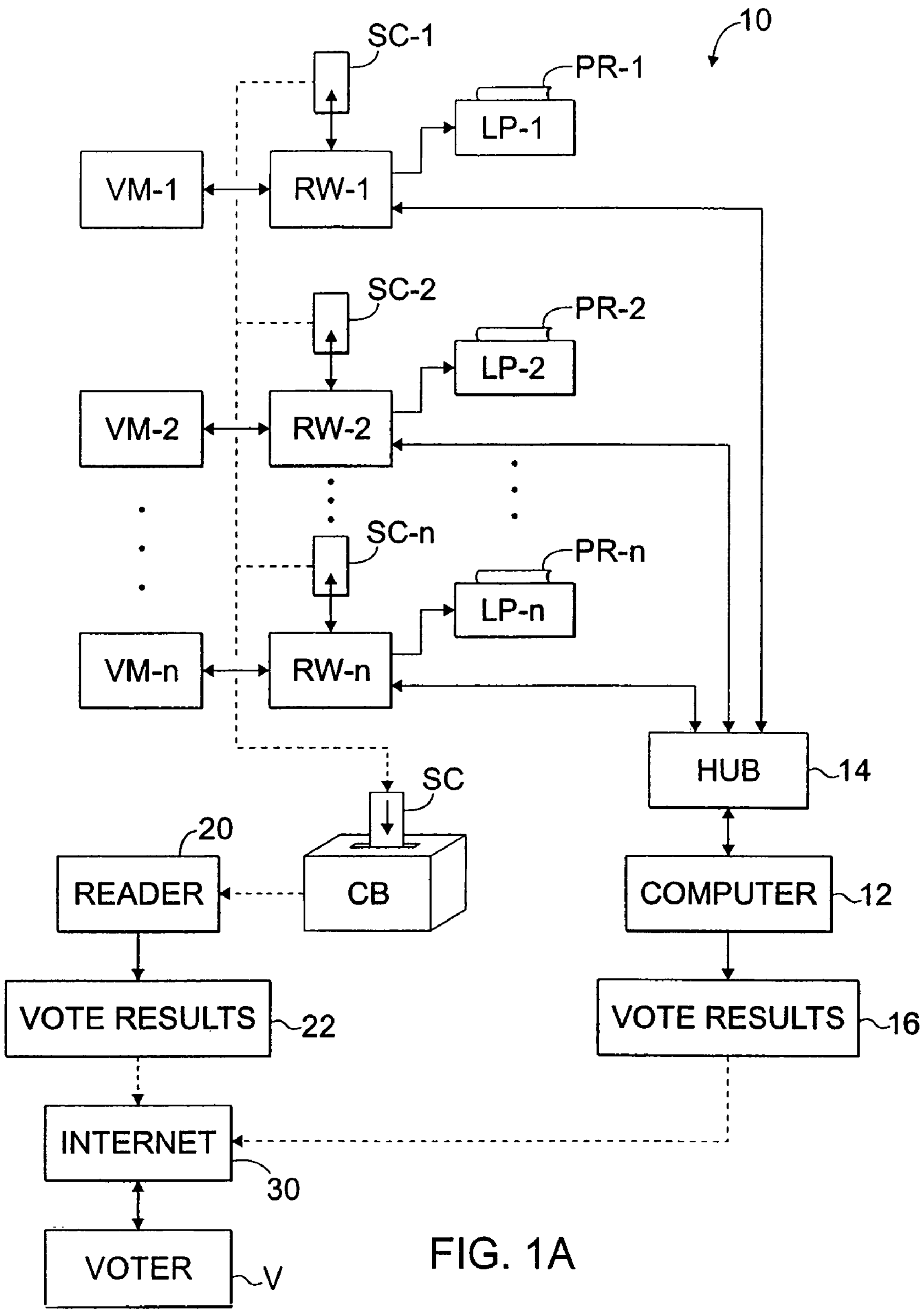
FIG. 1A is a schematic block diagram of an example embodiment of a voting apparatus and system according to the present arrangement and utilizing the method of the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENT(S)

FIG. 1A is a schematic block diagram of an example embodiment of a voting apparatus and system 10 according to the present arrangement and utilizing the method of the present arrangement. The present arrangement addresses the problems and challenges set forth above with a voting machine VM that includes a logical use of a computer or processor in conjunction with firmware and/or other hardware. In particular, the processor provides a unique identifier for each voting session that is associated with the voting record of that voting session. A printer LP provides a tangible record or receipt of each voter's voting session and the voting session identifier. An optional smart card or secured memory card SC or other card or device with an embedded electronic chip provides a suitable amount of memory for storing voting information including but not limited to a record of the voter's voting session and the voting session identifier. The foregoing facilitates the accomplishing of the goals of a fast, low cost, and secure transparent voting system.

As used herein, "smart card" refers to an article having at least a memory capable of storing information. Typically, a smart card includes an electronic memory device, such as a semiconductor die or chip including an electronic memory circuit, attached to or embedded in a substrate of convenient size for handling and for printing desired indicia or other information on the surfaces thereof. Smart cards may also include other electronic devices such as processors, transmitters and receivers, as is conventional for providing a desired degree of security, for communicating information to and from the memory of the smart card, and for processing the information such information. Also typically, the card is about the size of a conventional credit card or the like, but may be larger or smaller. Smart cards are sometimes referred to by other names, such as chip cards and access cards.

As used herein, "transparent" and "transparency" refer to a voting apparatus, system or method that provides a way for each individual vote to be verified independently of the accumulated voting result(s). Preferably, transparency should be provided without compromising the secrecy of any individual vote or the privacy and confidentiality of the voting booth. More preferably, transparency can be provided that does not rely upon the security of official voting records or the actions of any individual, even an election official.

One or more voting machines VM-1, VM-2, . . . VM-n are provided for voters to enter and to cast their votes, such as for candidates for office, or for or against public questions, referenda, constitutional amendments and the like, in accordance with governing law. Voting machines VM-1, VM-2, . . . VM-n may be together at a common location, e.g., a polling place, or may be dispersed in any convenient number of places. Operatively associated with each of voting machines VM-1, VM-2, . . . VM-n is a decoder reader/writer RW-1, RW-2, . . . RW-n, respectively, into which is inserted an optional smart card SC-1. SC-2, . . . SC-n each containing at least an electronic chip providing a memory of suitable capacity.

In order to vote, each voter must insert an optional smart card SC into reader/writer RW or otherwise enter a voter identification number into voting machine VM to activate voting machine VM to allow voting. The card or tag or device SC with embedded electronic memory chip preferably has security features so that the memory chip cannot be tampered with. Typically, information stored in smart cards SC may include a voter identification or serial number, e.g., relating to the rolls of registered voters, and/or voter name and address or other identifying information, identification of the voting district and/or polling place for which the smart card is valid, and/or the date of the election for which the smart card is valid, and/or a security code representative of any one or more of the foregoing by which validity and authenticity of the smart card may be validated.

It is noted that while the voter identifier and voting session identifier may be referred to as "numbers," it is not intended that such be limited to numerical characters, but any alphanumeric, numeric or symbols may be utilized in such identifier(s). Further, while such identifiers may also be referred to as "serial numbers," they may not be numbers or true serial numbers in a numerical or other sequence, but may be in any order or in no identifiable order. Unlike a conventional barcode or magnetic stripe card, which is easily tampered with, the secure memory or smart card SC cannot be readily tampered with or copied. This is an important difference provided by utilizing a smart card SC as a medium for both verification of voter identification as well as record keeping of the votes cast. Either a contact type smart card SC or a contact-less (wireless) type smart card may be utilized. Typical contact type and wireless (contact-less) type cards suitable for smart card SC are available from many sources. For example, cards employing electronic chips such as types SLE4442 and SLE4428 are available from Siemens located in Germany. Microprocessor chip cards available from Atmel Corporation located in Colorado and "Mifare" wireless/contact-less cards contain an electronic chip from Philips located in the Netherlands or from Siemens.

Smart card decoding reader/writer devices RW available with suitable firmware utilizing standard smart card reading and/or coding protocols can be utilized or may be modified to provide additional security. A typical decoder reader/writer unit RW is, for example, similar to those made for access control applications by Avante International Technology, Inc. located in Princeton, N.J., Fargo Electronics, Inc., of Eden Prairie, Minn., and others, is suitable for this type of secure voting system application. Devices RW need only write a record of voting information to the memory of smart card SC, which may be a blank card issued to each voter at the polling place or otherwise, or have information as described above stored therein, in accordance with the present arrangement. Device RW need not be able to read information stored in the memory of smart card SC unless it is desired to have information stored therein that is to be utilized by voting machine VM in connection with the process of allowing a particular person to vote, e.g., such as a name, password or other personal identifier, or other information as described above.

A processor within voting machine VM employs application specific computer software or an applications shell in conjunction with a standard relational data base computer program to operatively function with decoder reader writers RW-1, RW-2, . . . RW-n for reading data stored in the memory thereof and for writing data to be stored in the memory thereof. In addition, the processor also includes or has associated with it a random number generator or pseudo-random number generator or a list or sequence of unique numbers that are utilized to provide a unique voting session identifier to the voting session of each voter. Processor P may associate such voting session identifier with the voting session either at the commencement thereof or at the conclusion thereof or at any other convenient time substantially contemporaneous therewith. The computer software for processor P is typically similar to that employed in access control systems such as the trade-show retrieval systems and access control systems available from Avante International Technology, Inc. located in Princeton, N.J. and from others. Typically, such software utilizes the "Visual Basic" programming language and a relational data base such as the "Access" data base, both of which are available from Microsoft Corporation located in Redmond, Wash., and may be stored on any convenient medium, such as software stored on a floppy disk or a hard drive or as firmware stored in an electronic memory or the like. The flow chart of an example embodiment of such voting system and computer program is described, for example, in relation to FIGS. 3-5 below.

Also operatively associated with each of voting machines VM-1, VM-2, . . . VM-n is a respective printer LP-1, LP-2, . . . LP-n, respectively, for providing a respective tangible voting record PR-1, PR-2, . . . PR-n, such as a printed receipt, for each voter at the conclusion of his voting. Each voting record PR-1, PR-2, . . . PR-n includes the randomly assigned identifying or serial number unique to the particular voting session and a listing of the votes that the voter has cast (the voting record) that is identical to the voting record and identifying number stored in voting machine VM. The information (voting record and voting session identifier) that is printed on the printed voting receipt PR is identical to the information written into the memory of smart card SC. As a result, there are three separate and independent identical records of the voter's votes and voting session identifier, i.e., one stored in the memory (memories) of voting machine VM, one stored in the memory of smart card SC, and one printed of the voting receipt PR.

Voting machines VM may store an individual voting record for each voter or may simply accumulate the cumulative voting results as each voter casts his ballot, thereby having no record of individual voting, or may store both. Preferably, such voting record and voting session identifier are stored in the at least two independent non-volatile memory devices of voting machine VM, only one of which is typically coupled to the central computer 12 at the time for transferring voting records thereto. Preferably, the voting information stored in the smart card SC is written over any identifying information relating to the particular voter or such information is erased by voting machine VM, thereby assuring that identity of the voter cannot be ascertained from the information stored in voting machine VM, in smart card SC and on printed receipt PR Each voter deposits his smart card SC into a secure collection box CB before leaving the polling place (if voting machine VM and/or smart card encoder RW do not automatically collect smart card SC, which is preferable) and the voter retains the printed voting receipt. The smart cards SC in the secure collection box CB are an independent and separate re-countable electronic record of the voting, i.e. of each vote cast. Preferably, all three independent records, voting machine VM, smart card SC and printed receipt identify the voting record of the particular voter by the same unique voting session identifier which, because it is randomly assigned, is not and cannot be associated with the personal identity of the voter. Two independent identical records of the voting are held securely by the voting authorities, i.e. those in the voting machine VM and those in smart cards SC, while the third is held by the individual voters.

Figure 1B:
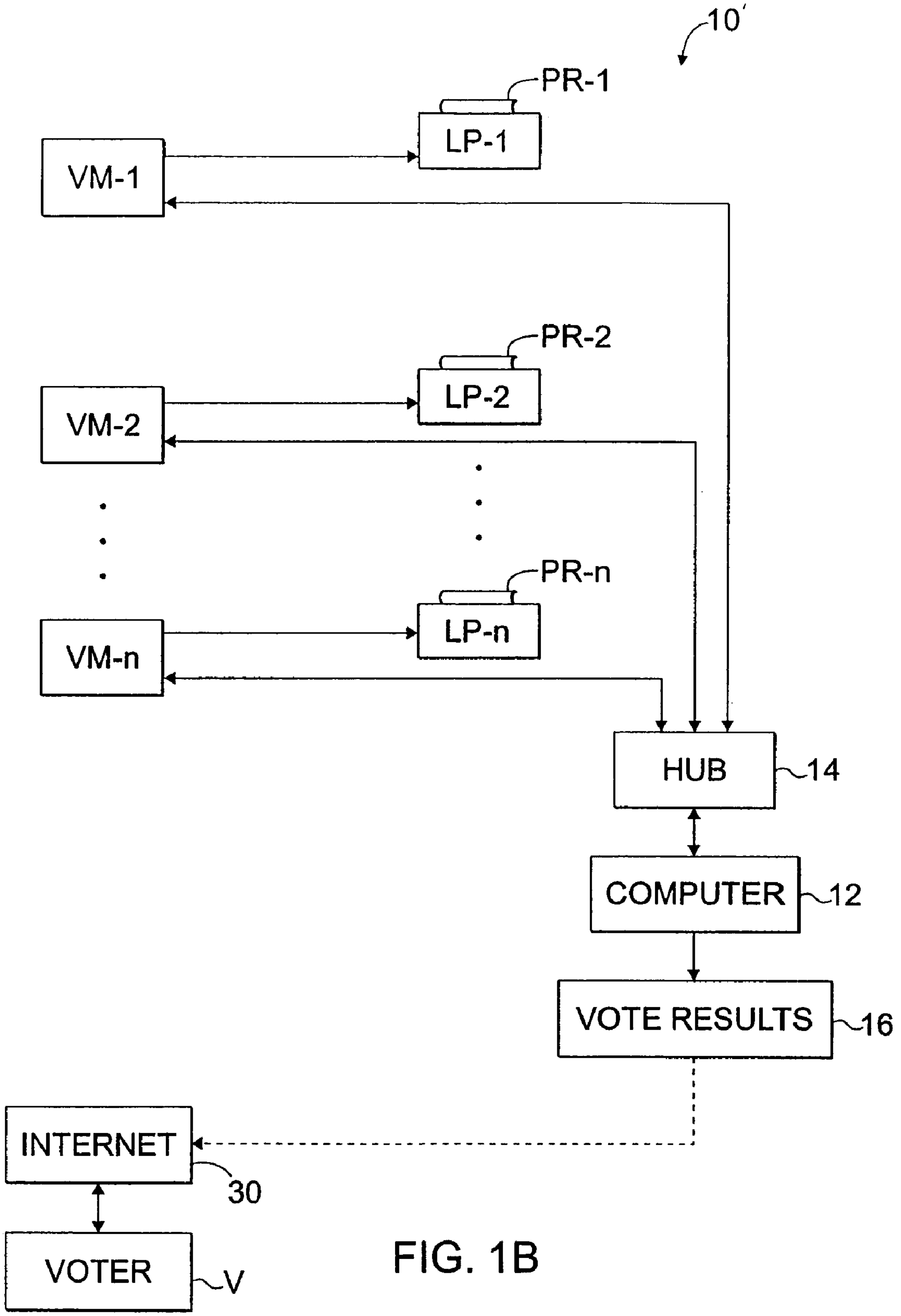
FIG. 1B is a schematic block diagram of an alternative example embodiment of a voting apparatus and system according to the present arrangement and utilizing the method of the present arrangement.

FIG. 1B is a schematic block diagram of an alternative example embodiment of a voting apparatus and system 10' according to the present arrangement and utilizing the method of the present arrangement. Voting system 10' is in all respects like voting system 10 of FIG. 1A described above, except that smart card encoder RW and smart cards SC are not utilized. To the extent that smart cards SC may have been utilized to verify voter information and/or initiate a voting session on voting machine VM, such is accomplished in the system 10' of FIG. 1B by an election official, as is conventional, or by the voter entering a number or other identifier or identifying information into voting machine VM, or by any other suitable arrangement.

At the conclusion of a voter's voting session, voting machine VM stores the voting record of a voting session and the voting session identifier associated therewith by its processor in its internal memory or memories and provides same to local printer LP which provides a tangible record PR, e.g., in the form of a printed receipt PR, to the voter. Note that system 10' still provides at least two independent and separate identical voting records for each voting session and that these are associated with a voting session identifier by which vote tabulation may be verified independently and on a vote-by-vote basis. In particular, any voter may utilize the voting session identifier on his printed receipt PR to check the published vote results 16 to verify that his vote has been correctly recorded, thereby providing transparency of voting results 16.

With respect to both FIGS. 1A and 1B, at the end of the prescribed period for voting, e.g., when the polls close, voting machines VM are coupled to a central computer 12 and communicate either the accumulated voting result or individual voting records, or both, to central computer 12 which then combines the voting data from all of voting machines VM to tabulate and produce vote results 16. Typically, central computer 12 would be located in a secure area or facility, such as a county or state election office, or both. Where plural voting machines VM are located in close proximity, such as at one polling place or in a central facility to which they are brought at the conclusion of voting, communication by such machines with computer 12 may be through a hub 14, such as a local communication hub, a local area network, a server, the public telephone network, an electrical cable, or the like, or the memory or memories M may be removed from the voting machine VM and inserted into a reader associated with computer 12 for reading the voting results stored in such memory or memories M.

It is noted that the present arrangement provides complete freedom to the voting (election) authorities as to how and when the voting data is communicated to the central computer 12. It may be communicated essentially in real time as each vote is cast, or at the end of each voting session, i.e. immediately and sequentially, or may be communicated periodically either through out the appointed period for voting or at the conclusion of voting, either from the voting machines while still at the polling places or from a central or other facility to which the voting machines VM are transported. Vote results 16 may be announced or may be posted on the Internet 20 or otherwise communicated as is desirable and convenient, either as cumulative results and/or as a collection of individual voting records. Note that where the results are published as individual voting records with the voting session identifier associated therewith, the results are 100% transparent because each individual voter may use the voting session identifier printed on his tangible receipt to check the voting record posted against that on the printed receipt.

For security and confidentiality, voting information communicated from one apparatus to another, whether such is in a common location or in separate or distant locations, is preferably encoded or encrypted, such as by public key and/or private key encryption or other encryption, as is conventional. Even where the voting information is communicated over communication links to which an unauthorized person may gain access, such as public telephone lines, radio communication or the Internet, the apparatus according to the present arrangement provides additional security because there is always at least one separate set of records stored in the memories of smart cards SC against which the otherwise communicated voting information can be compared and verified. Thus, whether the election is local, regional, statewide or nationwide, the arrangement of the apparatus of the present arrangement is arranged for avoiding and circumventing any possible tampering and/or hacker attack. Of course, transporting the voting machines to a central facility with appropriate security avoids the possibility of tampering or hacking.

In the event any question arises as to the outcome of the voting, such as where the result is a very close or where the integrity of the primary vote results 16 are challenged or questioned, a parallel and independent counting of the vote may be made utilizing the collected smart cards SC collected in secure collection box CB. All the collected cards CB are processed through and are read by a smart card reader 20 and the voting results, either as a cumulative vote result or as a collection of individual voting records, or both, are produced as vote result 22 which is available for comparison to the primary vote result 16.

In accordance with the present arrangement the collected set of individual voting records from the primary vote result 16 and/or the backup vote result 22, may be made available, such as via the Internet 20, so that an individual voter V can log on to an election web site and, using the unique voting session identifying number recorded on his printed receipt PR, verify that his vote as printed on his confirmatory receipt PR has in fact been accurately recorded and tallied in the vote results 16 and/or 22.

The present arrangement provides complete transparency to the voting process because every voter receives positive confirmation that his vote has been properly recognized and recorded before he leaves the polling place, and because any voter V can verify that his vote was tallied in the vote results 16, 22. Moreover, voting confidentiality is maintained because the only information that can associate any voter and his vote is the randomly assigned unique voting session identifier that is unrelated to his personal identity. Further, voting integrity is improved because at least two separate and independent, but identical, records of the voting are provided and can be independently tallied and compared in case of challenge or question. Should vote tampering or other illegal practice be suspected or alleged, any voter can confirm whether such is the case by comparing the posted record of his voting record posted on the Internet election web site with his individual printed receipt PR.

Where voting machines VM maintain records of each individual vote, authorities can cross compare vote-by-vote using the unique voting session identifier assigned to each voter's voting session and voting record without knowing or being able to ascertain the identity of the individual voter. Such comparison can be to the voting records stored in one of the preferably two independent memories of voting machine VM or to the printed voting record receipt PR of an individual voter, or both, or to the voting records stored on the collected smart cards SC, if utilized. Moreover, such checking and comparison is private, e.g., whether by voting officials, or the public, e.g., via the Internet, because the voting session identifiers are preferably not related to voter identity.

Figure 2:
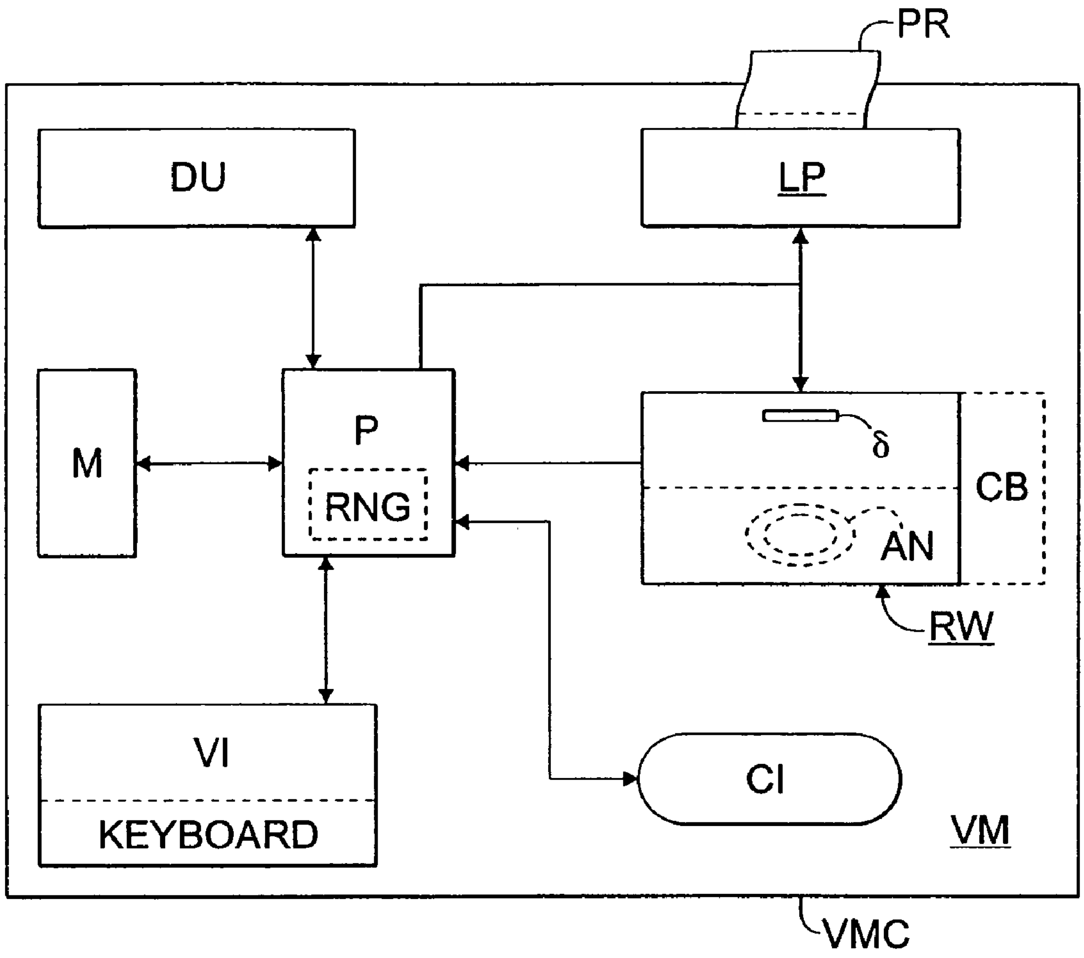
FIG. 2 is a schematic block diagram of voting apparatus according to the present arrangement and utilizing the method of the present arrangement.

FIG. 2 is a schematic block diagram of voting apparatus VM according to the present arrangement and utilizing the method of the present arrangement. Voting machine VM includes a processor P for processing information relative to a voter and/or voting and for providing a voting session identifier, a non-volatile memory M for storing and providing such information, a display unit DU for displaying information to the voter, and a voter interface VI whereby the voter can enter information into voting machine VM for processor P and/or memory M. It is noted that the components of voting machine VM are similar to the components of a personal computer and so a conventional personal computer, with or without modification, may be utilized in voting machine VM, although it is likely that conventional computer components, particularly processor P and memory M, may be utilized in conjunction with displays DU and input devices VI adapted to or customized for the voting machine application, for example, for ruggedness, resistance to tampering and/or abuse. In addition, processor P includes a function for providing unique voting session identifiers for each voting session, for example, a random-number or random-character generator RNG or a look-up table or other suitable generator.

Memory M may also be of any suitable non-volatile memory type. Suitable memory devices include floppy disks, computer hard disk drives, writeable optical disks, memory cards, memory modules and flash memory modules (such as those utilized in electronic cameras), magnetic and optical tapes and disks, as well as semiconductor memories such as non-volatile random-access memory (RAM), programmable read-only memory (PROM), electronically erasable programmable read-only memory (EEPROM) and the like. Memory M or a separate memory contains the operating system, data base and application software that operates processor P as voting machine VM.

Alternatively, various programming information, a voting session identifier generator or list, voting information, candidate and office information and the like may be provided in firmware, such as in an EPROM, which provides additional resistance to tampering and/or hacking attack. Such firmware may be utilized, for example, for controlling the reading and writing of information to optional smart cards SC, the storing of voting record information in memory M, particularly, a specific memory device such as a memory chip card, an optical disk or tape, or other electronic, magnetic or optical media. Preferably, memory M of voting machine VM includes two independent non-volatile memory devices so that voting record information and a voting session identifier are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI may be a standard or custom keyboard, as may facilitate write-in voting, or may be dedicated vote buttons or switches similar to conventional mechanical voting machines, for example, or may be a touch-screen interface associated with display unit DU, and is typically connected to processor P via cabling. Special keys can be provided for voting functions such as “Elect” or “Select” or “Vote,” or for “Erase” or “Change,” or for “Write-in.” Alternative voter interfaces VI may include voice recognition apparatus, Braille keyboards or pen systems with writing recognition interfaces, each preferably with confirmation of the data entered displayed on display unit DU or even aurally via headphones.

Display unit DU may be of any suitable type, such as a conventional cathode ray tube or computer display, an LCD display, a touch-screen display or other suitable device, for displaying alphanumeric and/or graphical information, or a set of illuminated buttons, as desired, and is typically connected to processor P via cabling. Display unit DU may also include Braille devices, aural information via headphones, or other devices specially suited for people with handicaps.

Operatively associated with or coupled to processor P and memory M are a printer LP for providing a tangible record of the voting session, e.g., a printed paper receipt and an optional smart card reader/writer RW for writing and/or reading information from/to a smart card. Preferably, local printer LP and optional reader/writer RW are built into the physical container VMC of voting machine VM along with processor P, memory or memories M, display DU and voter interface VI, and that physical container VMC is rugged and sealable for security and to prevent unauthorized access to the components therein, thereby being resistant to tampering. Other components of a voting booth, such as a privacy curtain, an opening and closing mechanism therefor, and a floor stand, need not be part of voting machine container VMC, but may be permanently or demountably attached thereto as is convenient and desirable.

Optional smart card reader/writer RW is operatively associated with or coupled to processor P and memory M for writing information including at least a unique voting session identifier and a voting record into the memory of a smart card SC and optionally for reading information, such as voter registration and/or identifying information, from a smart card. Each voting session identifier is a randomly-generated unique identifying or serial number or character sequence (e.g., a pseudo-random number) of at least eight characters or digits, and preferably of 12 or more characters or digits. Such voting session identifiers are generated for each voting session of each election, either centrally and then loaded into memories M of voting machines VM or by processor P as each voter participates in a voting session. It may be desirable for the voting session identifiers to include additional characters identifying voting district and/or the polling place and/or the voting machine VM on which the vote associated with the identifying number was cast, and/or the date and time of the voting session, but not the voter, so as to preserve voter anonymity while providing traceability of voting records. If any information particular to an individual voter is stored in the memory of smart card SC, as may be the case where information confirming voter registration or an identifying PIN number, security code or other personal data is utilized, such information is written over or erased or otherwise rendered permanently unrecoverable either before or at the time that voting record and voting session identifier information is stored in the memory of smart card SC by reader/writer RW of voting machine VM.

If reader/writer RW is a contact-type reader for use with contact-type smart cards, then the smart card SC is inserted into slot S thereof to be read and/or written to. If reader/writer RW is a wireless or contact-less-type reader for use with wireless or contact-less-type smart cards, then the smart card SC is placed proximate to antenna AN of reader/writer RW to be read from and/or written to. If reader/writer RW is of a type for use with both contact-type and wireless or contact-less-type smart cards, then the smart card SC is inserted into slot S if it is a contact-type smart card and is placed proximate to antenna AN if it is a wireless-type smart card, or is either inserted into slot S or is placed proximate antenna AN if it is a so-called “combi-card” that combines both external contacts and an internal antenna so that it can be read from or written to either via contacts or a wireless communication.

Further, while optional smart card encoder RW need only be able to write information to a smart card, it may also read information stored in a smart card SC and provide same to processor P. Reader/writer RW may also be a decoder to decode information read from a smart card SC in encrypted or encoded form, and/or may also be a coder that encrypts or encodes information being written to the smart card SC. Such encryption and/or encoding may use public key encryption or any other suitable encryption and/or coding arrangement. Optionally, and preferably, reader/writer RW may include a “take-in” or capture mechanism that grabs smart card SC when it is inserted into slot S and, after the voting record and voting session identifier information is stored in the memory of smart card SC, deposits smart card SC into a secure collection box CB operatively associated with reader/writer RW and located in voting machine cabinet VMC. If this option is utilized, and it may be utilized with either contact-type or wireless smart cards SC, a separate collection box CB and action by each voter to deposit his or her smart card SC therein is not needed.

Figure 2A:
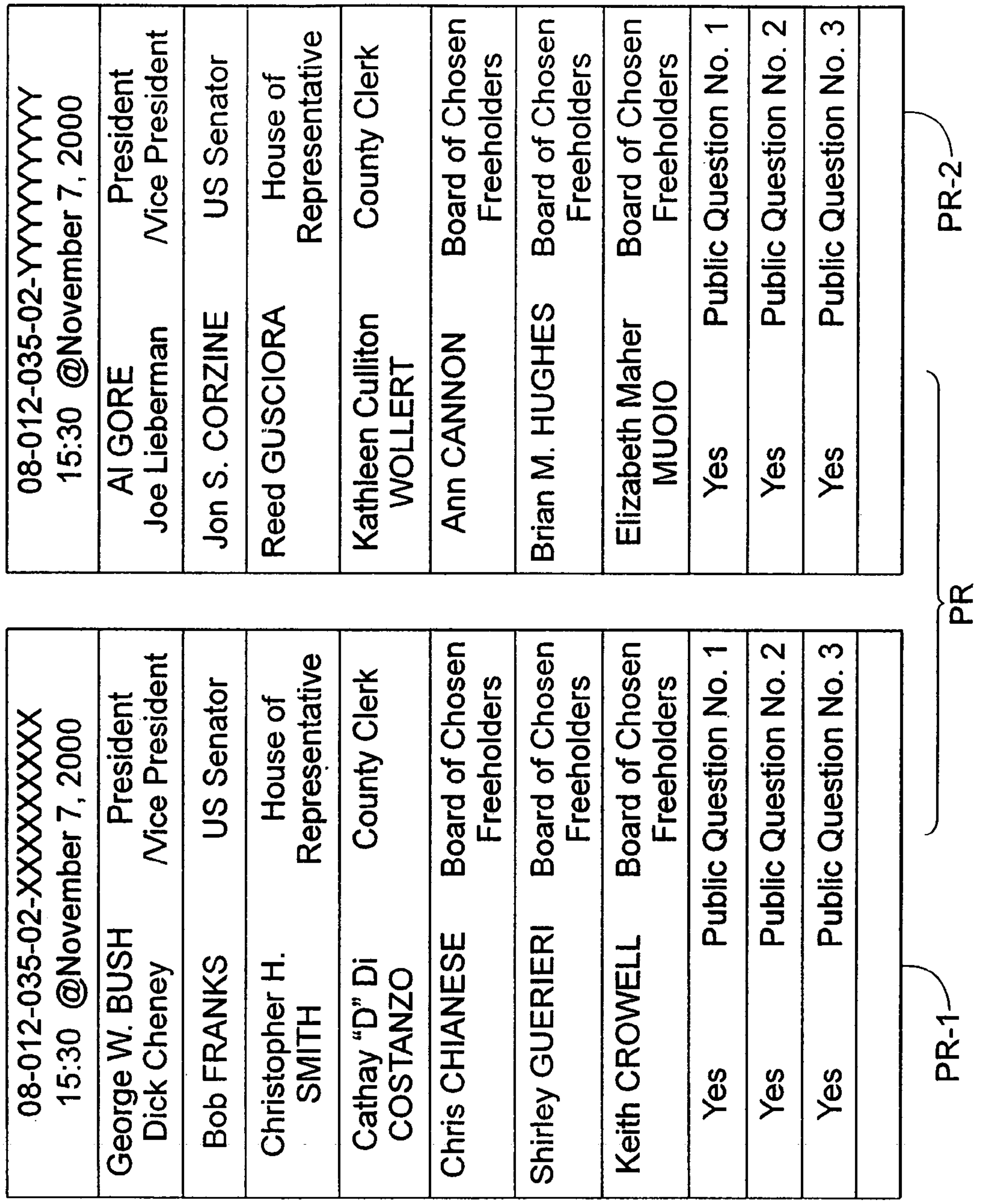
FIG. 2A illustrates example tangible receipts therefrom.

Local printer LP provides a tangible independent record of each individual voter's voting selections associated with the voter's unique identifying number. Printer LP is of a type that retains no record of the data printed (e.g., is not a daisy wheel or other printer employing a ribbon or other sheet-type ink source from which information printed may be extracted or reconstructed) such as a thermal printer, a dot matrix printer, an ink-jet printer, a bubble jet printer, a laser printer and the like, which are conventional. A specialty or security-type of paper, or other medium making authentication of a printed receipt easier and counterfeiting of altering of same more difficult, can be utilized, thereby reducing the likelihood of counterfeiting or fraud. Desirably, printer LP also prints information identifying the election district, the date and time of voting and similar information that may help to authenticate printed receipt PR. Example voting receipts are illustrated in FIG. 2A.

Preferably, voting machine VM displays on display DU the voting record of the voter and requires at least one confirmation, and preferably a second confirmation, by the voter that the displayed voting record is indeed the vote(s) the voter intended to cast, in order to end a voting session. Information as to any offices or questions or referenda with respect to which a vote has not been cast can also be displayed and called to the voter's attention before the voting session is concluded. Upon the voter confirming the voting record, the electronic data thereof is provided to the memory M of voting machine VM and to printer LP to be recorded on the voter's printed receipt with the voter's unique voting session identifier. Where optional smart card reader/writer RW is employed, the same data as is stored in memory M is encoded into the memory of smart card SC. Preferably, the same electronic data provided to display unit DU to be displayed to the voter is communicated to both printer LP and to optional reader/writer RW over a common path so there is certainty of consistency, although this is not necessary as it may be convenient for processor P to provide such electronic data in the particular forms required by a standard card reader/writer RW and a standard printer LP, rather than to provide a customized reader/writer RW and a customized printer LP each having a customized electronic data interface.

"Write-in" ballots can be accommodated by a special entry column that comes after the listing of all the named candidates. Any write-in voting can be done through the use of the keyboard or touch screen or other suitable means of data entry associated with voter interface VI and/or display DU. In this case, the "write-in" will typically include the last name along with first name of the person for whom a write-in vote is being cast, and, optionally, a middle name or initial, as is required by law and is common in conventional write in voting. The tabulation of write-in votes can be done manually or through processor P utilizing the same data base and polling software that records non-write-in votes, or by any other suitable methods and means.

The preferred VOTE-TRAKKER™ voting system and apparatus as illustrated by FIGS. 1B and 2 provides at least double redundancy for voting record and voting session identifier data in that each vote is recorded by at least two independent and verifiable means: to wit, by electronic recording in one or more electronic memories included in each voting machine, and by a confirmatory printed or other tangible record provided to each individual voter. Desirably, the preferred VOTE-TRAKKER™ voting system and apparatus as illustrated by FIGS. 1A and 2 provides triple redundancy for voting record and voting session identifier data in that each vote is recorded by at least one additional independent and verifiable means: to wit, by electronic recording in the memory of a smart card separate from the voting machine and the printed record. This apparatus, and the process and method it performs, provide 100% transparency of each and every vote and maintains 100% privacy and confidentiality of each and every voter and vote.

Figure 3:
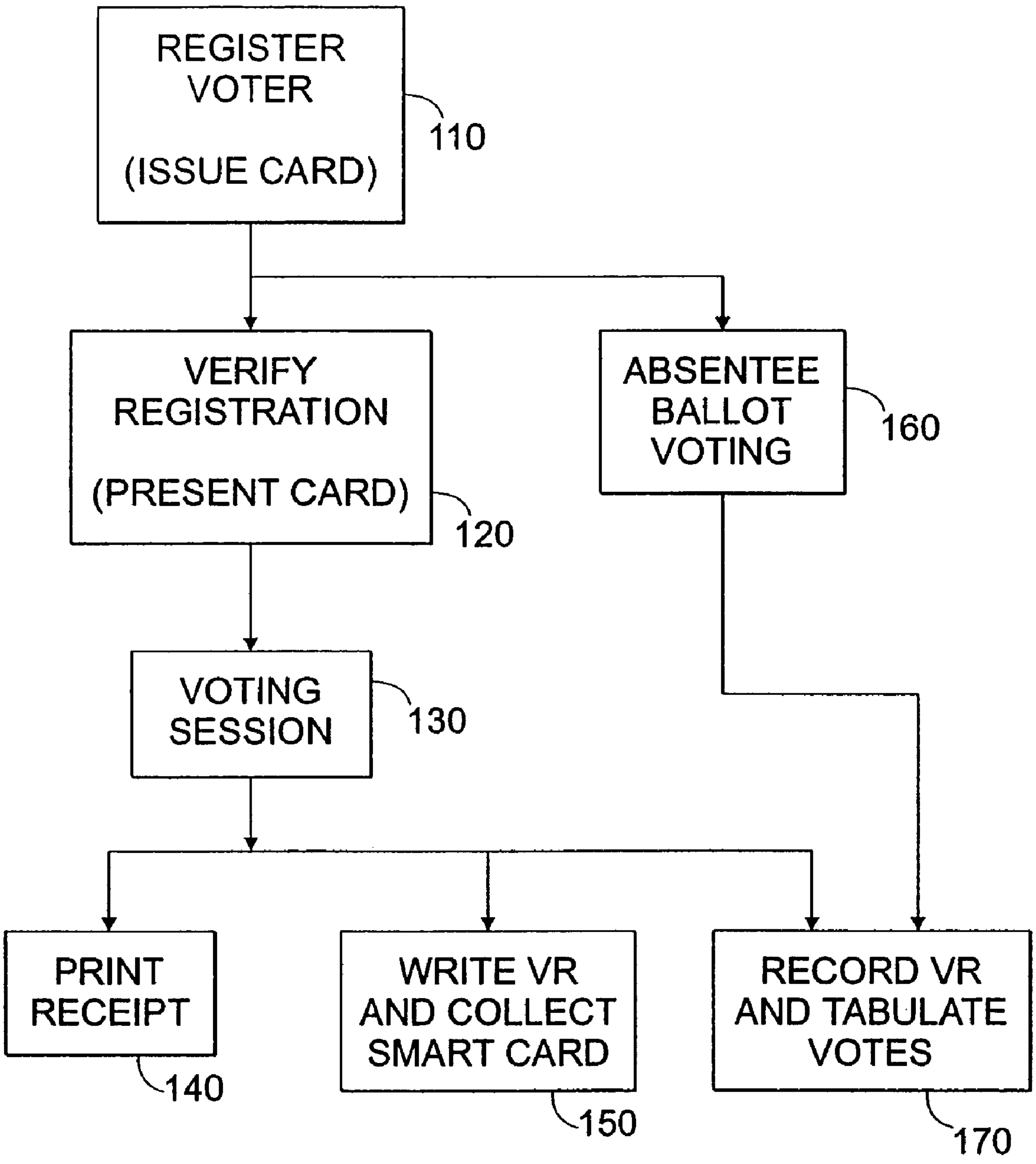
FIG. 3 is a schematic flow diagram illustrating the voting method according to the present arrangement.

FIG. 3 is a schematic flow diagram illustrating the voting method 100 according to the present arrangement. A voter registers to vote 110 and during the appointed times for voting, presents appropriate identification at the polling place so that his or her voter registration is verified 120 in accordance with the applicable law and procedure. Having properly done so, the voter is authorized to vote by the election officials and utilizes the voting machine provided for having a voting session 130 during which the voter makes his or her voting selections. As part of the voting session 130, a unique voting session identifier as described herein is provided for each voter and is associated with the voting record of that voting session which represents the voting selections made by the voter.

If an optional smart card or secured identity card is utilized, it is provided to each voter to serve as identification of the voter and proof of registration to vote. Each smart card is encoded with at least a specific assigned unique voter identifying number of at least eight digits, and preferably at least 12 digits, for tracking and future reference, and all smart cards for a particular election and polling place may also include the same particular security code or identifier that cannot be changed and that identifies the authorized polling location and election for which the smart card is valid. Each voter's smart card is utilized at the end of that voter's voting session 130 to record that specific voter's voting choices (voting record) and voting session identifier for subsequent use, if necessary, in recounting or verifying the votes cast, or for other challenges to the voting process. The voting record and/or voting session identifier is preferably written over any information such as a voter identification number that if not rendered unreadable would or could be utilized to ascertain from the smart card the identity of the particular voter who used it to vote. Optionally, an electronic marker, which may be the voting record or voting session identifier or any part thereof, is written into the memory of the smart card when it is utilized to cast a vote, to avoid its use for more than one voting session. Because the smart card includes a read/write memory, it may be erased and thus be recycled and reused for subsequent elections.

If utilized, a secured memory or processor chip card (or tag), i.e. a smart card, is issued 110 to each registered voter before the time for voting, i.e. prior to commencement of the period during which voters may cast their votes or at registration. A secured memory or smart card with an embedded electronic integrated circuit (IC) having substantial memory capacity, for example, over 1 kilobyte of memory, is preferred. For example, types SLE4442 or SLE4428 memory ICs available from Siemens, or other suitable equivalent, may be utilized. This memory bank IC is used for storing the voter's identifying number (ID) and the election/polling place security code before the card is used to vote, and after being used in a voting session stores the voter's voting selections, i.e. a voting record, and the voting session identifier, for subsequent recount, if necessary. The secured memory card should be issued anew with a new suitable and specific "Personal Security Code" or other unique identifying number for each election, for the purpose of providing a high level of security. Voting district or other political sub-divisional information, or other personal or social data, such as the voter's name, address, height and weight, eye and hair color, sex, birth date and age, a digitized photo, and the like, may also be stored in other portions of the smart card memory and may be utilized for providing a more secure election and election records as well as a improved identification of the voter, however, such information is preferably erased or otherwise rendered unreadable when the card is utilized in a voting session so as to preserve the voter's anonymity.

On election day, if the optional smart card is utilized, each registered voter presents 120 the pre-issued smart card with appropriate identification, if required, to the election officials at the polling place. A smart card reader may be utilized to verify the identity of the voter (i.e. of the person to whom the particular smart card was issued) and the validity of the smart card, as for confirming proof of identity. This optional verification and confirmation may be performed prior to the voter entering the voting booth or in the voting booth by the voting apparatus thereof, either by comparison to registration and/or personal information previously stored in the memory M of the voting machine VM or by communication link to a computer having a memory containing such information.

The voter now enters the voting booth or voting apparatus in order to vote 130. The voting session generally includes inserting the optional smart card, if utilized, into the voting apparatus, optionally verifying the voter's registration to vote, the voter making his or her voting selections, and the voter confirming the voting selections to end the voting session and establish the voting record of such selections. Specifically, the voter may enter an identifying number or may insert the smart card into the voting booth smart card reader to initiate a voting session 130. Based upon the information entered or read from the smart card, the voting apparatus through the voting system, may optionally make comparison of such information with official registration information. If the voter is correctly and properly registered to vote and if the information and/or smart card is proven valid, voting information will appear on a display screen of the voting apparatus for voter selection and voting. Voting information may appear all at one time for all offices, referenda, public questions and the like, or may be presented to the voter sequentially one office or question at a time. Once the voter makes a selection, the selection may continue to appear on a portion of display screen, e.g., with highlighting, while other selections are made or are made available one category at a time.

Once the voter has responded to all selections, all of the selections made will appear on the display screen for easy verification. If desiring to change any selection, either because a mistake has been made or he or she has changed his or her mind, the voter may select a "change button" to repeat a selection of a particular category or may select a "start-over button" to start the whole voting process again or may simply press the same button as previously pressed to make a selection to un-make that selection. The change and/or start-over buttons may be used at any time during the voting session, or at the end of making selections, and the button(s) may be physical buttons or touch zones on a touch screen display. If the voter confirms the selections by selecting a "confirmation" button or "confirmation" area on a touch-screen, the voting session is ended and the voting record and the voting session identifier generated by the voting machine are stored 170 in the non-volatile memory of the voting machine. If desired, a second confirmation could also be utilized. The same voting record and voting session identifier are also transferred 170 to a central computer via a local area network within the voting facility or at a central voting facility, either as each voter completes a voting session or at the end of the voting period, as desired. Continuous connection to a location outside the voting facility should be avoided to prevent and/or reduce the likelihood of computer hacking or other outside attack on voting information.

Substantially contemporaneously with termination of the voting session, the same voting record and associated voting session identifier as are stored in the voting machine non-volatile memory are also written 140 to a tangible record, i.e. a printed copy for ease of voter verification of the vote as recorded. The voter may keep the printed record for his/her own reference. The voting records of all the voting sessions are tabulated or tallied 170 at the conclusion of the voting period for voting.

If the optional smart card is utilized, the same voting record and associated voting session identifier as are stored in the voting machine non-volatile memory are also written 150 to the memory of the smart card. After confirming his or her vote at the end of the voting session, if the voting apparatus does not automatically collect 150 the smart card, the voter is required to deposit 150 the smart card into a secure collection container before leaving the voting area. The smart cards containing the voting records of each specific voter are used for recounting 170 if the voting is challenged, and provide a separate and independent record of the voting records for such purpose. Once the election is over and the result officially certified, the information written to the smart card memory can be erased and, if desired, the smart card can be "recycled" for subsequent usage, e.g., in a later election.

Once the vote selections are confirmed, the voter is finished voting and the printed or other tangible record is made 140. If the law allows, however, the present arrangement provides a safeguarded way for the voter to correct or change his or her vote, at least if the smart card, if utilized, has not yet been collected 150. A voter who realizes he or she has made a mistake or who has a change of heart regarding his or her vote may call upon an official in charge of the election for help to void or erase the previously cast voting record and to start his or her voting session all over. Preferably, the voting record of the second (correction) voting session is recorded along with the voided voting record from the first voting session and the respective voting session identifiers for both the original voting session and the corrective voting session. The voided voting record from the first voting session is not actually erased, but is retained in the voting apparatus and is not counted in the vote tabulation, along with identifying information read from a smart identification or control card issued to the election official who authorizes the corrective voting session.

To enable the voting apparatus and system for such corrective voting session, the election official must insert his control card along with the voter's voted smart card, if utilized, to select and void the voting record already stored in the computer memory and remove it from the official voting records to be tallied and to allow the voter to repeat the process of voting. The changed voting record will be stored in a separate data base for use in constructing a history of the voting record, along with the voting session identifier and the identifying information from the election official's smart card.

In addition to the voting records of an election, the respective tabulations and tallies thereof may also include the voters' unique voting session identifiers for ease of inspection of voting records by the voter for confirming their accuracy. Such tabulated voting records serve as a public right-to-know record as well as maintaining the secrecy of voter's choice because only the voter knows his unique voting session identifier. If desired, demographic and other social data and the voter's corresponding choices may also be tallied as part of the voting record, if useful and allowed by the voting law and regulations, recognizing that such information is generally irrelevant under systems of law as in the United States and its maintenance derogates privacy.

A suitable relational data base, such as "Access" available from Microsoft Corporation or "Oracle" available from Oracle Corporation, may be utilized to record and tabulate voting records, depending on the size and complexity of the data being sought after. For most elections involving a population or political sub-division of less than about 10,000,000 people, a simple Microsoft Access data base may be adequate. Data base software and other computer programs may be provided as firmware so as to better secure the programming and to help to eliminate or reduce the possibility of tampering.

For absentee voting 160, voters may request a voting registration number or smart card in advance of the election similarly to the timing for conventional absentee ballots. Absentees may vote in any compatible specially designated voting booth that may be located in any convenient location so long as it is under the necessary control as required by the voting law, e.g., under personal control of a state election official. Because demographic information, such as the voter's home address and voting district, may be stored in the smart card along with other voting information, such designated smart card voting machine may be utilized by voters from different voting districts, different counties, or even different states, if desired. For example, a smart card voting machine could be located on a military base or in an embassy or consulate in a foreign country for use by all armed forces embassy and civilian personnel assigned to the base, embassy or consulate, as well as by their authorized dependents.

Alternatively, absentee voters may use the traditional mail-in paper ballot in the conventional manner, with or without an officially-issued smart card for processing the absentee ballot. One or more election officials having one or more "official's cards" will insert such official's smart cards into the voting machine and cast a vote as prescribed by the paper absentee ballot for such person following exactly the same voting process as described above. The voting record and voting session number for each such absentee voting session, which include information from the official cards identifying the official entering the absentee voter's vote, are stored in a separate data base and are tabulated with the voting records from the standard voting 120-150. As a result, any subsequent challenge or recount can be easily monitored with detailed voting records of absentee votes and regular votes.

Figure 4:
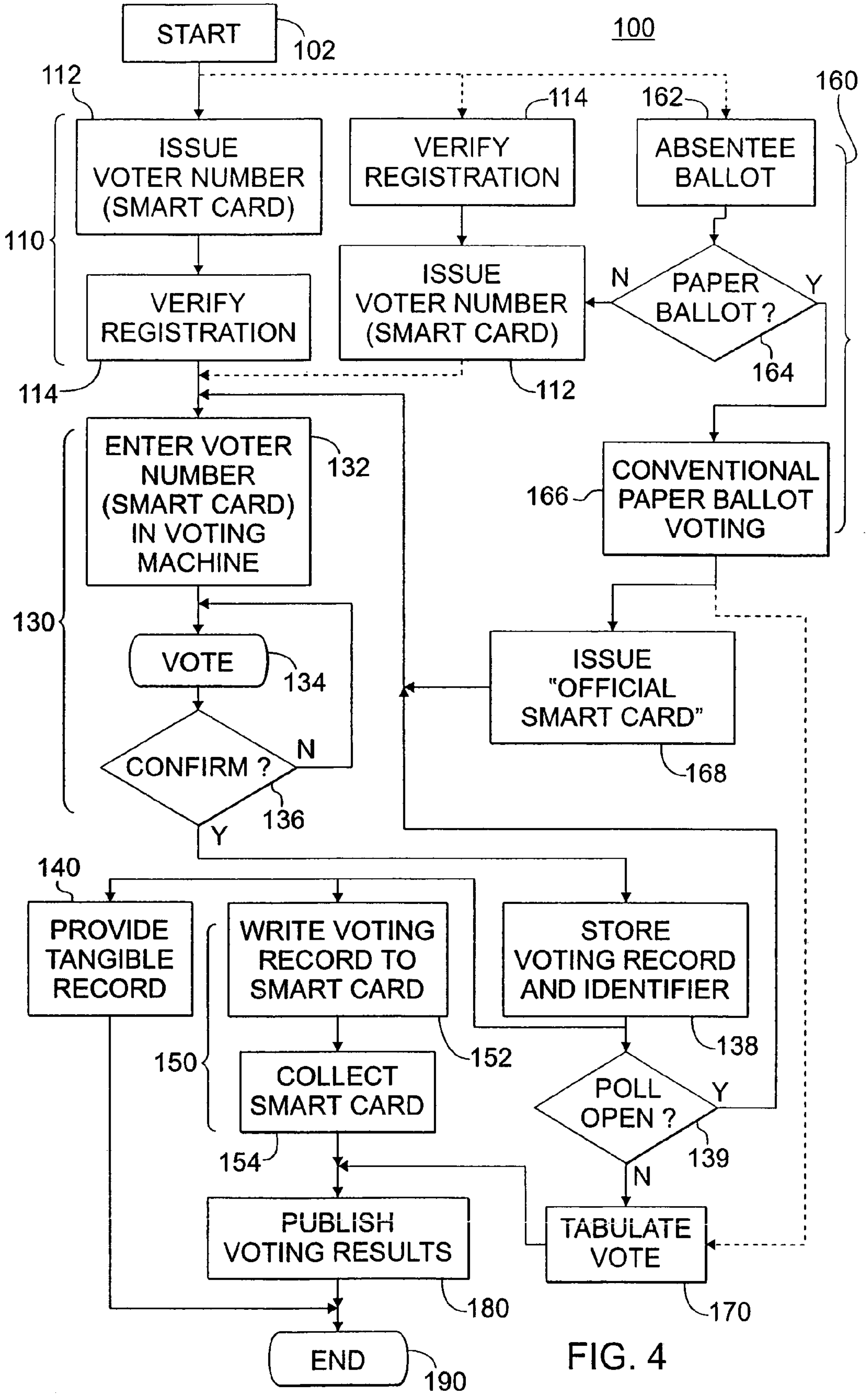
FIG. 4 is a schematic flow diagram illustrating the voting method according to the present arrangement in greater detail.

FIG. 4 is a schematic flow diagram illustrating the voting method 100 according to the present arrangement in greater detail. Although FIG. 4 illustrates the utilization of an optional smart card, it is understood that the method of FIG. 4 may be practiced with or without a smart card. Initially 102, the voter presents proof of citizenship and residence as is necessary for registration to vote, and alternatively, satisfies any other requirements for registration for voting and issuing 110 of a voter registration. If smart cards are utilized, the voter could be issued a smart card at this time or prior to the election, as is desired. Such registration may include, for example, connection and providing of information through a local area network with the computer that will ultimately be tabulating the voting along with the voters' unique identifying (serial) number, i.e. registration number, so that eventually, all voter registrations are recorded on the central computer for the verification 114 of voter registration and/or ultimately, during and/or after an election, the storing/recording 138 of voting results. The stored voting results include but not limited to each voter's voting record and voting session identifier, i.e. unique identifying serial/identifying numbers, which may be published 180 or/and posted in public location and/or posted 180 on a special election web site for examination by the voters and other members of the public.

Election officials may issue a unique voter-identifying serial number or registration number or voter number for the registered voter, or a voter card or "voting ticket" with the voter's personal data thereon for verification 114 of voter identity. An election official may type in the serial or other number of the registered voter to verify 114 registration before allowing the voter to vote. This verification module may be linked to a registration data base that is separate from the voting machine, such as in a central election computer. The election official then issues 112 to the voter an authorization to vote. If smart cards are utilized, such authorization may include a chip card or smart card with the same unique identifying serial number and personal identification data (e.g., similar data to that of driver license for ease of verification by the voting attendant or election official). Alternatively, any other suitable verification criteria, including signature comparison, driver's license identification or the like, may be utilized to authenticate 114 the voter's registration, in accordance with the applicable election law and voting procedure, and to issue 112 a voting authorization and/or smart card to the voter.

If utilized and alternatively, a chip card (i.e. smart card) is issued 112 to the voter with a unique identifying serial or registration number and, optionally, personal identification data (e.g., similar data to that of driver license) for ease of verification by the voting attendant or election official. The voter takes the smart card to the polling place, verifies registration 114 and then inserts the chip card into the smart card reader/writer of the voting machine to activate 132 the voting machine to initiate and engage in a voting session. Alternatively, the voter may insert the chip card into the smart card reader/writer of the voting machine to verify 114 registration to vote and activate 132 the voting machine to initiate a voting session It is noted that while the chip card is preferably used as a repository of a separate voting record electronic file, its use is optional depending on the level of voting record redundancy required and/or desired.

The next step is for the voter to vote 130. The voter initiates 132 a voting session, such as by pressing a button, by moving a lever or handle or switch, or by entering an identifying number, personal security code (PSC), personal identifying number (PIN) or the like. If a smart card is utilized, inserting the chip card can activate the voting machine to begin/initiate a voting session 134. The voter votes 134 by making selections for election of the candidates for different posts or offices, and/or for public questions, constitutional amendments and the like. Alternatively, the voter can elect to make a write-in entry for a candidate not listed on the predetermined ballot. Suitable means of voting data entry include but are not limited to a touch-screen, a "point-of-sale"-type special keypad, a standard keyboard, voice-recognition, a specialty keyboard for handicapped persons (e.g., a Braille keyboard for the blind).

Before a voting session is completed, the voter confirms 136 the voting selections he has made. If the voter does not confirm 136 his selections (path "N"), the voting machine allows him to change his selections and/or make additional selections. If the voter confirms 136 his selections (path "Y"), the voting session is complete and the voting record along with a unique voting session identifier generated by the voting machine are stored 138 in the memory devices of the voting machine and are also provided to produce 150, 140 at least one separate tangible record of the voting session. A printer is utilized to provide 140 a tangible printed receipt including at least the voting record and voting session identifier, and may also include election and voting information such as date, time and polling place location. Where smart cards are employed, at least the voting record along with the unique voting session identifier is also provided 152 the smart card reader/writing device to be stored in the smart card which is collected 154. All "raw" voting records are preferably stored 138 within the voting machine by suitable means of electronic data storage that are redundant so as to provide a stored voting record and voting session identifier that are separate from and will be available as a back-up to the computer storage thereof. The stored 138 voting record data is available anytime later, should it be needed, as for a recount or challenge.

The tangible receipt device provides 140 a tangible receipt such as a printed receipt. The smart card reader/writer erases personal data, if any, stored on the voter's smart card and encodes 152 the voters selections 134 and voting session identifier on the card memory for future use, such as for electronic recounts. The smart card is collected 154, either automatically by the card reader/writer or by the voter depositing the smart card into a secure collection box. The voting machine memory as well as both the printed receipt and the encoded information stored in the smart card include the same voting session identifier which is a serial number as issued by the voting machine or a randomly generated unique identifying serial number generated from a defined set that is associated with the particular voting record if absolute privacy is preferred. The voting session identifier or serial number may include identification of state, county, precinct, or other appropriate political sub-division (e.g., the "08-012-035-02" identifying a polling location illustrated), along with the random portion of the session identifier or serial number assigned to assure privacy (e.g., the "XXXXXXXXX" and the "YYYYYYYYY" randomly generated numbers illustrated), such as is illustrated in FIG. 2A. The time and/or date of voting may also be optionally recorded on the printed receipt and in the voting record stored in the voting machine, the smart card, or both, for future inspection and/or verification.

If the period for voting has not ended, the poll open test 139 is affirmative (path "Y") and the voting machine is available to the next voter. If not, the voting machine accepts no further voters (path "N") and the vote is tabulated 170. The determination of poll open or not may be by local timer, voting official deactivation of the voting machine or signaling from a central election location and/or computer.

The confirmed 136 voter selections are tabulated 170, for example, via a local area network connection to a computer for tabulating the voting along with the voters' identifying serial numbers. Eventually all voting records are tallied 170 along with the voters' voting session identifiers or serial numbers, and can be published 180 for examination by the voters or other members of the public. Such publication 180 may include distribution of printed copies and/or posting copies in a public location or on a special election web site on the Internet. The voting process ends 190 when all of the voting records are tabulated and the election results are certified or otherwise made official and final in accordance with the election law.

Absentee voting is provided 160 by conventional paper ballot 166 or by smart card issuance 168, as is desired. An absentee ballot is requested 162 and election officials determine 164 (or have predetermined) whether a conventional paper ballot or an optional smart card should be issued. If a paper absentee ballot is not to be utilized (path "N"), a smart card is issued 112 and the voter utilizes the smart cord to vote 130 as described above, for example, although the authorized voting machine may be in the voting district or remote from the voting district, as described above, or the voting 130 may be performed in advance of or at a different time from the normal election day voting period.

Figure 4A:
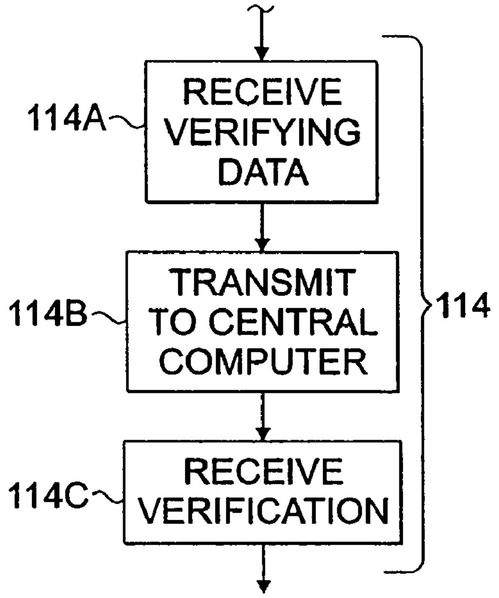
FIGS. 4A-4D are schematic flow diagrams illustrating further details and alternatives for the voting method of FIGS. 3 and 4.

FIGS. 4A-4D are schematic flow diagrams illustrating further details and alternatives for the voting method 100 of FIGS. 3 and 4. FIG. 4A illustrates an alternative to on-site verification 114 of voter registration by the election officials presiding at that place. The officials or a data entry device at the polling place receives 114A verifying data from the voter and that data is transmitted 114B to a central computer in which resides files identifying properly registered voters. The central computer checks the voter's data to verify registration to vote and provides 114C verification of registration to the polling place. If smart cards are utilized, verification 114 may be before or after issuance 112 of a smart card to the voter.

Figure 4B:
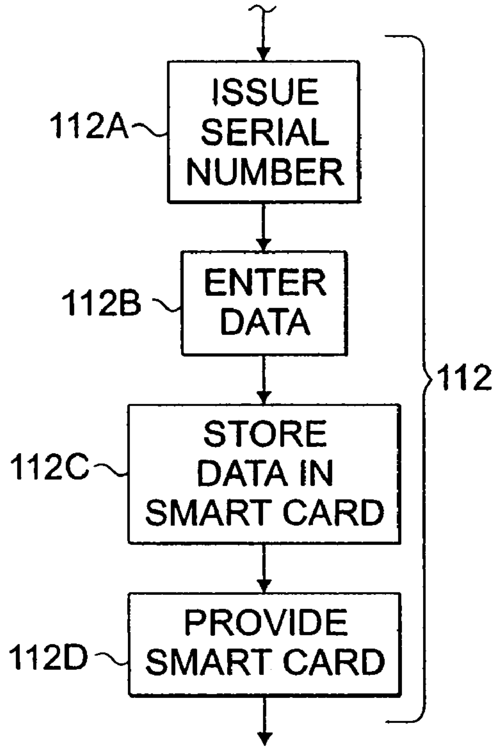

FIG. 4B illustrates alternative steps for issuing 112 an optional smart card in which a unique voter identification number is issued 112A and then voter data is entered 112B into the voting system. The data entered is stored 112C in the memory of the smart card and the smart card containing such data is then provided 112D to the voter, who may thereafter utilize it for verifying registration and/or in voting.

Figure 4C:
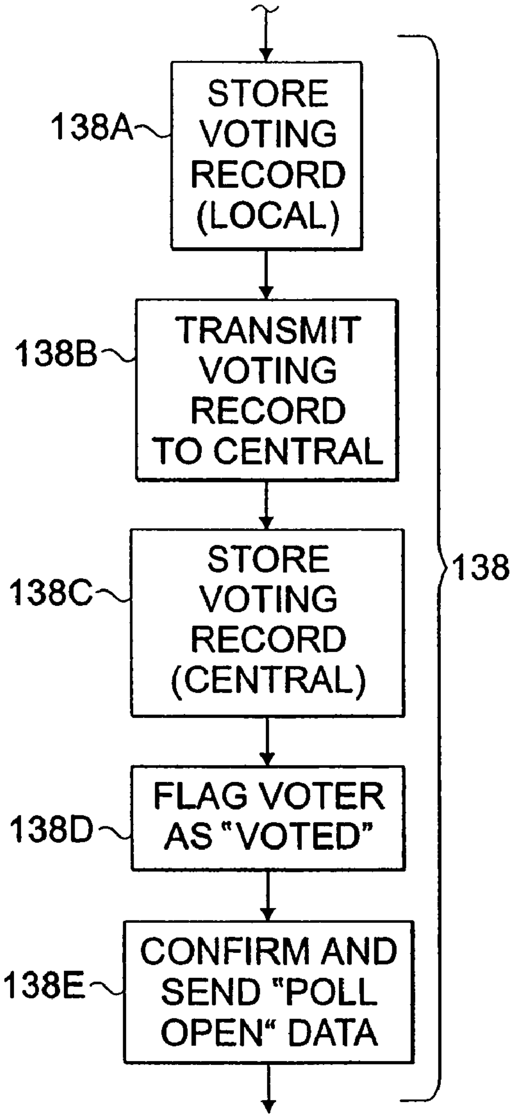

FIG. 4C illustrates alternative steps for storing 138 voting record and voting session identifier information at the conclusion of a voting session. When the voter has confirmed 136 his voting selections, the voting record thereof and the voter's voting session identifier are stored 138A in the memory device or devices of the voting machine, i.e. locally, and are also transmitted 138B to a central election computer. The central computer stores 138C the voting record and voting session identifier and also "flags" or marks 138D the registration record of that voter to indicate that the voter has voted in the election. Optionally, the central computer may confirm 138E to the voting machine computer that the voting record has been centrally stored and/or confirm 138E that the polls are still open to enable voting by additional voters. One advantage of this arrangement is that by marking the voter's registration to indicate that the voter has voted, further attempts by the voter to vote will be rejected, thereby eliminating any voter voting more than once. Thus the old cynical saw, "Vote early, vote often," can no longer be applicable.

Figure 4D:
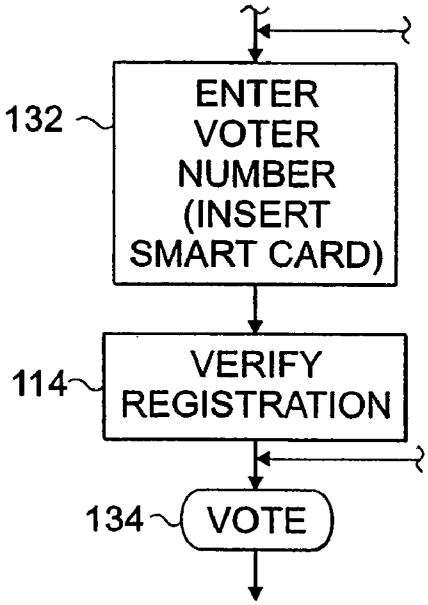

FIG. 4D illustrates alternative steps for verifying voter registration as part of each voter's voting session. In voting 130, the voter enters 132 his voter identification information or inserts 132 his smart card into the voting machine to open it for voting. Before the voting machine opens for voting 134, the voter's registration is verified 114, either by reference to registration data stored in the voting machine or via central verification 114 of the sort described in relation to FIG. 4A. A voting session is initiated only if and when the registration is verified 114.

The present arrangement can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the present arrangement. Storage media for containing such computer program include, for example, floppy disks and diskettes, compact disks (CD)-ROMs (whether or not write-able), DVD digital disks, RAM and ROM memories, computer hard drives and back-up drives, and any other storage medium readable by a computer. The present arrangement can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the present arrangement. The present arrangement may be implemented on a general purpose microprocessor or on a digital processor specifically configured to practice the present arrangement. When a general-purpose microprocessor is employed, the computer program code configures the circuitry of the microprocessor to create specific logic circuit arrangements.

Accordingly, the voting system and method of the present arrangement may be provided on such computer storage media for causing voting apparatus to operate responsive thereto in performing the present arrangement. While the voting device utilized by the voter is referred to herein as a "voting machine," the voting machine is not wholly mechanical but is partially or wholly controlled and operated by a computer or processor. Thus, the present arrangement may be implemented by providing an appropriate computer program to an existing voting machine or apparatus, such as in the form of a read-only memory device or module or other firmware, a floppy disk or other magnetic media, and CD-ROM or other optical media and the like, or by a communication utilizing an electronic and/or optical communication path.

Voter Registration and Smart Card Issuing: Similarly to the current voter registration process, each individual voter is mailed a voting ballot sample that reflects the actual voting ballot to be utilized in the official election. A smart card is encoded with a unique serial number, such as a voter identifying number, and is issued for each individual voter. This serial number has at least enough digits for representing the voting population, e.g., at least 8 digits, and preferably 9 or more digits, e.g., for anonymity. If the set of unique serial numbers may be utilized as voting session numbers, which is not preferred, the numbers should be independently generated anew for each election, and should not be related to the voter's traceable numbers, such as social security number, telephone number, address and the like. It should be used by and only be traceable, if at all, at the voter registration office, i.e. by election officials, and should be strictly controlled for security and protection of voter privacy.

Optionally, information regarding each voting district can be encoded into the smart card with another set of numbers that represent such district and its political sub-division, such as voting precinct or other specific voting related information. The serial numbers may be optionally published, for example, with the vote tallies and records of each individual voter's choice associated only with the anonymous voter's serial number (voting session identifier) may be posted in the Internet for absolute transparency of voting records and yet maintain the privacy and confidentiality of each voter's choices. Any dispute or challenge to any particular voting record, if permitted, must be made with the printed receipt that the voter was issued at completion of the voting session and is retained for verification, because the voter's printed receipt contains the same voting record and unique identifying number (voting session identifier) with which the voter's smart card was been encoded. The voting record stored in the smart card and printed on the voter's receipt may also include the date and time of voting and/or the identity of the polling place, voting district and voting machine, as desired. The medium on which the printed receipt is printed may have security indicia or other authentication or security features, if desired.

After the voting result has been certified and the time for challenge of the correctness of the election has passed, the information stored in the smart cards may be erased and the smart cards recycled for the next election. Each election should use a different identifying number or special personal security code (PSC) for each voter that cannot be modified easily without knowing the original code, which is known only to the election officials, and thus no confusion will ever occur, e.g., between voters in any one election or between voters in different elections.

The unique serial number assignment for each voter and the electronic record of the voting which includes the fact that particular serial numbers have been used to vote can, e.g., if utilized to verify eligibility to vote at the beginning of each voting session, eliminate any possible double voting or unauthorized voting.

If the smart card is mailed to the voter and is claimed to be lost, a separate replacement smart card may be issued to the voter at the election site, similar to the so-called "provisional" ballot utilized in some voting districts. The lost smart card serial number will be noted, and, optionally and preferably, may also be voided for the purpose of the present election. More security and control may be exercised where the issuing of replacement smart cards is made only with two election officials inserting their special election officer smart cards to enable the issuance of the voter's replacement smart card. The record of issuance of a replacement smart card will be listed as a separate record in the voting records stored in the voting machine and/or the central voting computer for ease of inspection and verification.

Specialty voters such as the "domestic absentee" and "overseas absentee" are issued specially serialized paper ballots and optionally, corresponding smart cards. Their votes will be made on the paper ballot and mailed back to the respective voting district or other proper election authority. Alternatively, the same smart card electronic voting facilities as are utilized in the home election districts may be made available at dedicated places outside such districts. For example, special voting locations can be made available such as at a local consulate or embassy of the country, and citizens in that place during the time for voting may vote there utilizing the absentee smart card received by mail.

If serialized paper ballots are used along with the serialized smart cards, the actual voting tally may be made with appropriately secured and supervised official tabulation at the voting district. The same voting and tabulation process as described above may be utilized, and the same transparent voting records are also available for the voter's inspection, e.g., via the Internet. All ballots voided for whatever reason may also be likewise posted for the same transparency.

Off-site and/or off-day voting may also be permitted. If the local or national laws allow, voting machines may be placed at locations other then the conventional polling centers. These sites may include police stations, post offices, schools, banks, and other suitable public locations with reasonable supervision and assistance to the voters. The voting can be done anytime, including days other than the general voting date, and could be for an extended period, e.g., for one or two weeks. The votes so cast will be verified and approved if the voter's smart card (chip-card) has been returned (collected)

and the voting record stored therein matches when compared with the voting record stored in the voting equipment and/or the optional central computer.

Electronic Re-Counting: If the electronic tallies of voters' choices as produced from the voting records stored in the voting machines is ever challenged, the optional collected smart cards may be read and easily tallied again for comparison, either as to accumulated voting results or on a vote-by-vote basis using the unique identifying number (voting session identifier). In fact, if desired, all the collected smart cards may be read and counted after the electronic tallying to verify the accuracy of the voting machine results. If any smart cards are missing (e.g., not collected or lost), they can either be readily verified for the record from the voting records stored in the voting machine or the vote can be disqualified.

If there is any challenge or discrepancy claimed by any voter, the challenged vote can be compared with the printed receipt that must be presented by the voter for making such claim which includes the specific serial number (voting session identifier) and the voter's choices corresponding to those stored in the respective memories of the optional smart card and/or the voting machine. The electronic voting records can be easily tallied and listed, and corrected, if appropriate, and may be published and or posted via the Internet to ensure the absolute transparency of the voting.

It is noted that the smart card can be read accurately almost 100% of the time and can be essentially absolutely error free. Conventional error reduction techniques such as comparison of multiple readings and error checking codes, or both, may be employed as is convenient and desirable.

It is preferable that the voting machine be able to automatically take-in the smart card (chip card) once the voter is finished voting. In the case where a semi-manual voting machine is used, e.g., where the voter is required to deposit his smart card in a locked collection box after voting, it may be required that if the smart card is not returned, the validity of the vote is lost, i.e. the vote may or may not count, depending on the law. Alternatively, the voting machine can be programmed so that the return of the voter's smart card must be made before the next voter can use the voting machine, e.g. as part of a double checking process for collecting smart cards. Once the voting time is over, the electronic tally of all voting is immediately available for each district from the voting machine(s) thereof and may be transmitted electronically to an election headquarters or other facility for making a total tally of the voting. All voting tallies may include the serial number (voting session identifier) of each voter for absolute transparency.

All smart cards utilized in voting are to be locked up and kept under security similar to that utilized for conventional paper ballots today. They can be automatically read and counted or recounted using an automatic smart card encoder unit or a smart card printer-encoder or reader such as those available from Fargo Electronics, Inc. located in Eden Prairie, Minn., or from Atlantek, Inc. located in Wakefield, R.I., or from Avante International Technology located in Princeton, N.J.

Alternative Media for Paper Ballot Replacement: The use of smart cards as part of the voting process can dramatically help to eliminate any doubt about the validity of the vote and the voting result, and is a great improvement over current election processes, especially those relying on paper ballots and punch card ballots. Instead of recording the voting record on an individual smart card that is mailed to the voter, the smart card may be utilized at the voting sites only. In that case, the unique serial number (voting session identifier) for each voter is generated and/or assigned during the voting process, e.g., by the voting machine during a voting session, with the voting record printed receipt having the same identifier for absolute transparency.

Alternatively, the individual voting record may be stored in the non-volatile memory built-in within the smart card (chip card) reader/writer, or alternatively, in the hard disk of the computer within the voting machine, preferably with built-in redundancy such as a parallel processor and/or non-volatile memory, or a combination of the above. In any case, the voting data should be stored as individual voter records associated with the voter's unique identifying serial number (voting session identifier) rather than as total or tally only. Also alternatively, the individual voting records may be stored in any other suitable electronic media, optical media, or even electronically or optically readable media printed on paper, as may be convenient, both within the voting machine or in the smart card.

Figure 5:
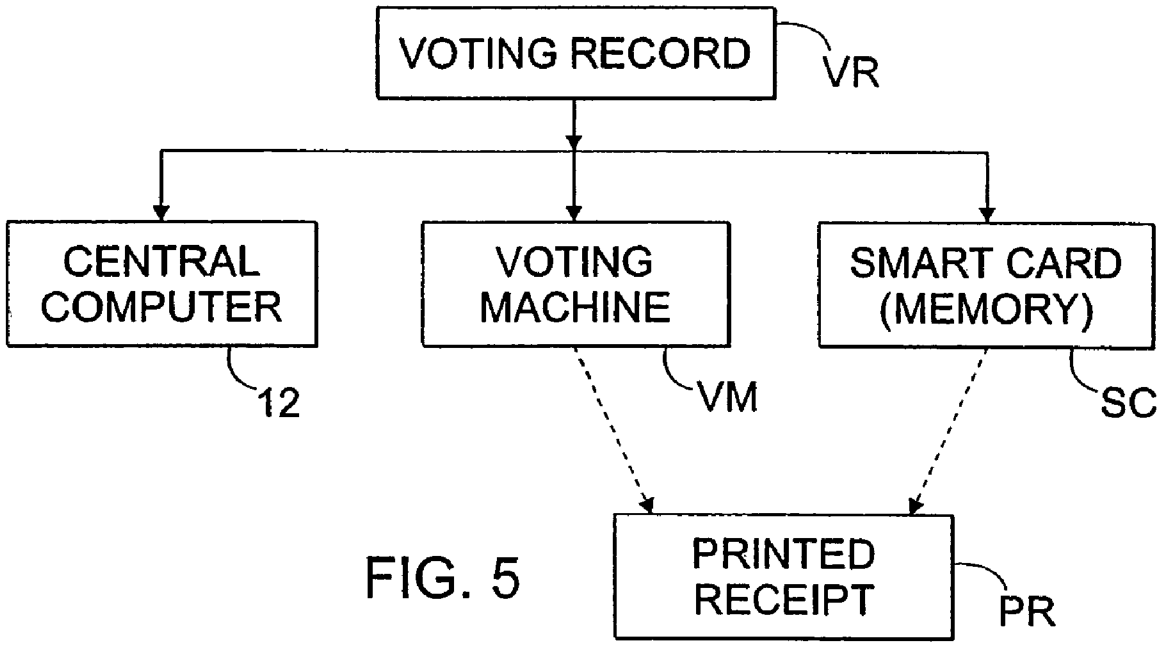
FIG. 5 is a schematic diagram illustrating a redundancy feature of the present arrangement.

FIG. 5 is a schematic diagram illustrating a redundancy feature of the present arrangement which includes triple voting record storage to ensure redundancy and security. Each voting record VR is produced by a voter making voting selections during a voting session and includes those selections as well as the unique identifying number (voting session identifier) issued to that voter. Voting record VR and the voting session identifier associated therewith are stored in three independent and separate memories: at least one (and preferably more than one) in central computer 12, at least one (and preferably more than one) in voting machine VM and one in optional smart card SC. Optionally, information relating to the voting session, such as the date and time of voting, the voting district and polling place, and the like may be associated with each voting record in any one or more of the separate memories and on the tangible receipt, as may be desired.

Computer 12 is typically linked to plural or multiple voting machines VM. Each of the voting records VR and voting session identifiers from each of the voting machines VM is down-loaded to computer 12 either immediately after each voting session or at the close of the voting period, such as via a conventional RS485 or RS232 electronic interface. All of the voting records VR and voting session identifiers are stored and tabulated by computer 12, such as by a relational data base such as "Access" or "Oracle". All of the tallies are eventually combined at the election headquarters or other official election site, i.e. usually where computer 12 is located. All voting records, voting session identifiers, and tallies thereof are made public with reference to each voter's randomly generated serial number (voting session identifier) for 100% transparency of the voting.

Voting machine VM includes an independent memory storage device for storing for the raw voting data and the respective voter's serial number (voting session identifier) associated therewith. Preferably, voting machine VM includes at least two separate non-volatile memory devices so that the integrity of the stored voting records is maintained even if one of the memory devices should malfunction, fail, or be tampered with. Each of the voting records VR is also transmitted to the computer 12.

A printer or other device outputs a tangible record PR of the voting record VR that includes all the information that is stored in and resides in the voting machine and in optional chip card SC. The printed-out receipt PR is retained by the voter for reference and for checking his or her vote against the final posted voting tallies which include the voters' identifying numbers (voting session identifier). The printed-out receipt PR typically includes, for example, the voter's unique randomly generated serial number (voting session identifier), all of the voter's voting choices (voting record), the time of voting, and other relevant data.

In addition, the same voting record VR and voter identifying number (voting session identifier) is optionally also recorded in the memory of smart card SC, i.e. using the chip card SC as a third separate and independent medium of storage. Each smart card SC represents one voting record VR and voting session identifier stored therein that can be electronically read even if the voting records stored in both computer 12 and voting machine VM are lost or corrupted for whatever reason, or if the election results need to be recounted or are challenged. Note that chip card SC stores an individual voting record VR including, for example, the voter's unique randomly generated serial number (voting session identifier), all of the voter's voting choices, the time of voting, and other relevant data.

A voting apparatus may comprise a processor for processing voting information and providing a voting session identifier, a display coupled for receiving voting information from the processor, and a voter interface for receiving voting selections made by a voter and coupling same to the processor. The processor provides a voting record including the voting selections, a memory is coupled to the processor for storing the voting record and the voting session identifier, and means are coupled to the processor for storing the voting record and the voting session identifier in a tangible medium separate from the memory. The display may include a cathode ray tube, a computer display, an LCD display, a display screen, a touch screen display, an aural device, and/or illuminated buttons. The voter interface may include a keyboard, a touch screen, a button, a switch, voice recognition apparatus, a Braille keyboard, a pen with writing recognition interface. The processor may couple the display to the voter interface for displaying the voter selections from the voter interface on the display. The means for storing the voting record and the voting session identifier in a medium separate from the non-volatile memory may include a smart card encoder and/or a printer. The smart card encoder may provide information read from the smart card to the processor. The information read from the smart card may include a voter identifying number, election information, voting place information, and the processor may associate the voter identifying number with a voter. The processor may verify a voter's eligibility to vote. The smart card encoder may be adapted for at least storing information in a contact-type smart card and/or a wireless-type smart card. The printer may include a thermal printer, a dot matrix printer, an ink-jet printer, a bubble jet printer, and/or a laser printer. The voting apparatus may further comprise a collection container for receiving a smart card, and the collection container may be operatively coupled to the smart card encoder for receiving the smart card after the voting record is stored therein. The memory may be a non-volatile memory and may include a floppy disk, a computer hard disk, a writeable optical disk, a memory module, a flash memory, a magnetic tape, an optical tape, a semiconductor memory, a random-access memory and/or a programmable read-only memory. The processor may include means for generating the voting session identifier, and the means for generating may include a random number generator, a pseudo-random-number generator, a random character generator, a pseudo-random-character generator, and/or a look-up table. The voting session identifier may be unrelated to a particular voter's personal identity. The voting apparatus may further comprise a communication interface coupled to the processor for communicating the voting record to an external device. The external device may include a computer for tabulating the voting record. The voter interface may include means for confirming the voting selections, and the means for confirming may be coupled for storing the voting record in the smart card and in the memory responsive to confirmation of the voting selections. The voting apparatus may be in combination with a smart card including a memory for storing at least one of the voting session identifier and the voting record.

In combination with an electronic voting machine comprising a processor, a display, a voter interface and at least one memory for storing a voting record of each one of a number of voting sessions, a generator of a voting session identifier for each voting session, which voting session identifier is unrelated to the personal identity of a particular voter conducting that voting session, and a printer providing a tangible receipt containing at least the voting record and the voting session identifier for each voting session. The combination may further comprise a smart card encoder for storing the voting record and the voting session identifier for each voting session in the memory of a smart card.

A voting system may comprise a computer for tabulating voting records, and at least one voting machine. The voting machine comprises a processor for processing voting information and providing a voting session identifier, a display coupled for receiving voting information from the processor, a voter interface for receiving voting selections made by a voter and coupling same to the processor, the processor providing the voting selections in a voting record, a memory coupled to the processor for storing the voting record and the voting session identifier, and means coupled to the processor for storing the voting record and the voting session identifier in a tangible medium separate from the memory; and means for communicating the voting record from the at least one voting machine to the computer for tabulating the voting record. The voting session identifier may be unrelated to a particular voter's personal identity. The means for storing the voting record and the voting session identifier in a tangible medium may include (a) a smart card encoder coupled to the processor for storing the voting record and voting session identifier in a smart card, and/or (b) means coupled to the processor for providing a tangible human-readable record including the voting record and the voting session identifier. The smart card encoder may provide information read from the smart card to the processor of the voting machine. The information read from the smart card may include a voter identifying number, and the processor may associate the voter identifying number with the voter. The means for communicating may communicate the information read from the smart card to the computer, and the computer may communicate verification of voter registration to the processor. The processor may be responsive to the registration verification to enable the voter interface to receive voting selections. The voting system may further comprise a smart card reader separate from the voting machine for reading the voting record stored in the smart card, whereby an independent tally of the voting record may be provided. The voting system may further comprise means for tabulating and publishing the voting record read by the separate smart card reader. The means for publishing may include making the voting record and/or voting session identifier available through the Internet. The voting system may further comprise means for publishing the voting records tabulated by the computer, and the means for publishing may include making the voting record and/or voting session identifier available through the Internet. The means for communicating may include an electrical cable, a local area network, a communication hub, a public telephone system, a radio communication, and/or an Internet connection. The means for communicating may be operative during (a) limited times during a period for voting, (b) all times in the period for voting, and/or (c) a time after the period for voting. The voting system may further comprise a collection container operatively coupled to the smart card encoder for receiving the smart card after the voting record is stored therein. The voter interface may include means for confirming the voting selections, and the means for confirming may be coupled to the processor for storing the voting record in the memory and in the tangible medium separate from the memory responsive to confirmation of the voting selections. The means for confirming may be coupled for causing the means for storing the voting record in a tangible medium to provide the tangible medium having at least the voting record thereon responsive to confirmation of the voting selections. The voting system may be in combination with a smart card including a memory for storing at least the voting session identifier and the voting record. The voting session identifier may include a first portion that is unrelated to a particular voter's personal identity and a second portion containing information relating to a date of an election, a time of the voting session, an identity of the election district, and/or an identity of a polling place.

A method for voting may comprise initiating a voting session, providing an identifier for the voting session, creating a voting record including the voting session identifier and voting selections made by the voter during the voting session, storing the voting record including the voting session identifier and the voting selections in a memory, and storing the voting record including the voting session identifier and the voting selections in a tangible medium separate from the memory. The method may further comprise providing an identifying number to a voter, and utilizing the identifying number for causing the initiating a voting session. Providing an identifying number to a voter may include providing a smart card having the identifying number stored therein. Utilizing the identifying number may include reading the identifying number stored in the smart card, and applying the identifying number so read to initiate the voting session. Utilizing the identifying number may include reading the identifying number stored in the smart card, and applying the identifying number so read for verifying eligibility to vote. Verifying eligibility to vote may include verifying that the voter is registered to vote and/or verifying that the identifying number has not previously been used to vote. Storing the voting record in a tangible medium may include storing the voting record in a smart card and/or may include providing a printed receipt containing the voting record including the voting session identifier and the voting selections. The method may further comprise tabulating the voting record including the voting session identifier and the voting selections from the memory, may further comprise publishing the voting record including the voting session identifier and the voting selections tabulated from the memory, and may further comprising tabulating the voting record including the voting session identifier and the voting selections from the tangible medium. The method may further comprise publishing the voting record including the voting session identifier and the voting selections tabulated from the tangible medium. Storing the voting record in a tangible medium separate from the memory may include storing the voting record in a smart card and providing a printed receipt containing the voting record. The method may further comprise comparing the voting records from any two or more of the memory, the smart card and the printed receipt. The method may further comprise confirming the voting selections, and confirming the voting selections may cause the storing the voting record in a memory and/or the storing the voting record in a tangible medium separate from the memory.

In an electronic voting system comprising a voting machine for providing a number of voting sessions for a number of voters: for each of the number of voters, a chip card providing a registration record and a storage medium for recording the voter's voting selections, wherein the chip card has substantial memory for recording all of the voting selections of one voter, and a chip-card reader/writer for coupling the registration information to the voting machine and for recording each voter's voting selections in the storage medium of that voter's chip card after that voter's voting session is completed. The registration record stored in the chip card may include a voter-unique serial number representative of voter identity and/or a processing code representative of election information that cannot be readily changed after the chip card is issued. The storage medium of the chip card may have a capacity of more than 2 Kilobytes, or of more than 8 Kilobytes, or of more than 32 Kilobytes. The registration record of the chip card may include a representation a voting district, an election, a voter-unique serial number, and/or voter identification information. The chip card may be collected at the end of the voting session after all of the voter's voting selections are encoded into the storage medium thereof, and the collected chip card may be read for producing the record of the voter's voting selections stored therein for counting the vote and/or publishing the vote. The registration record of the chip card may include a voter-unique serial number for that voter, and a tangible receipt may be provided including that voter's voter-unique serial number and that voter's voting selections. Voting records for each of the voters may be published or may be posted on the Internet, wherein each voting record may include the voting selections of a particular voter and that voter's voter-unique serial number, whereby the voting is transparent. The voter-unique serial number does not reveal the identity of the voter, whereby the voting is transparent and voter privacy is provided. The voting machine may include a keypad and/or a touch screen for the voter making voting selections. The electronic voting system may include a plurality of voting machines connected to a computer via one of a local area network and a communication hub, and the voting machines may not be connected to the computer via the Internet during the voting sessions.

A storage medium encoded with machine-readable computer instructions for conducting a voting session may comprise means for causing a computer to initiate the voting session, means for causing the computer to provide an identifier for the voting session, means for causing the computer to create a voting record including the voting session identifier and voting selections made by the voter during the voting session, means for causing the computer to store the voting record including the voting session identifier and the voting selections in a memory, and means for causing the computer to store the voting record including the voting session identifier and the voting selections in a tangible medium separate from the memory. Means for causing the computer to store the voting record in a tangible medium may include causing the computer to provide a printed receipt containing the voting record including the voting session identifier and the voting selections. Means for causing the computer to store the voting record in a tangible medium may include causing the computer to store the voting record including the voting session identifier and the voting selections in the memory of a smart card. Means for causing the computer to store the voting record in a memory may include causing the computer to store the voting record including the voting session identifier and the voting selections in at least two independent non-volatile memories. The means for causing the computer to store the voting record in a memory and the means for causing the computer to store the voting record in a tangible medium may be responsive to confirmation of the voting selections by a voter.

While the present arrangement has been described in terms of the foregoing example embodiments, variations within the scope and spirit of the present arrangement as defined by the claims following will be apparent to those skilled in the art. For example, the articles issued to individual voter's are referred to as cards, but need not be a card per se, but may be tags, sheets or articles of other suitable form providing a suitable voting record storage memory. Further, while the voting record is the to include the voter's identifying number and the voter's voting selections, the voting record may be related entries of the identifying number (voting session identifier) and the voting selections in a memory, such as in a computer relational data base.

It is noted that while the specific number, i.e. voting session identifier, associated with each particular voting record may sometimes be referred to as a "serial number," it is preferred that such numbers not be sequential or in any order that would allow relation of the voting record to a particular individual voter. Thus, a set of randomly-generated unique numbers or pseudo-randomly-generated unique numbers may be utilized and is preferred. A series or sequence of unique numbers (i.e. true serial numbers) could be utilized if the resulting loss of protection of voter privacy is acceptable, or if privacy is sufficiently provided for by security/secrecy of the numbers assigned. In addition, while "numbers" are referred to, such numbers need not be numerical, but may be any combination of alphanumeric or other characters or symbols. Similarly, voter identifying numbers, security codes and the like may also be numeric, alphanumeric or symbolic, as is desired.

The apparatus, system and method of the present arrangement provides a degree of security, privacy and transparency that is at least desirable, if not preferable or necessary for official governmental elections, the present arrangement may be utilized for private voting, labor representation and union elections and any other polling even though such unofficial or non-governmental polling does not require such security, privacy and/or transparency.

What is claimed is:

1. A method for voting providing a printed confirmation of voting selections made, said method comprising the steps of:

initiating a voting session;

creating a voting record including voting selections made during the voting session and a unique randomly assigned identifying number;

storing the voting record including the voting selections made during the voting session and the unique randomly assigned identifying number in a memory;

storing the voting record including the voting selections made during the voting session and the unique randomly assigned identifying number on a printed paper, wherein the printed paper is human readable, optically readable, or both human and optically readable; and providing the printed paper for verifying the voting selections made during the voting session that are printed on the printed paper.

2. The method of claim 1 further comprising the step of:

after said providing the printed paper for verifying the voting selections, modifying the voting record created during the voting session to include voting selections made after said providing an opportunity to verity the voting selections.

3. The method of claim 1 wherein the printed paper includes election information, date, time, polling place, voting district, election district, voting machine identifier, authentication information, authentication feature, security indicia, a security feature, or any combination thereof.

4. The method of claim 1 wherein said storing the voting record including the voting selections made during the voting session in a memory comprises storing the voting record in a floppy disk, a computer hard disk, a writeable optical disk, a memory card, a memory module, a flash memory, a magnetic tape, an optical tape, a magnetic disk, an optical disk, a smart card, an electronically readable media printed on paper, an optically readable media printed on paper, a semiconductor memory, a random-access memory, a programmable read-only memory, or any combination thereof.

5. The method of claim 1 further comprising the step of:

communicating the voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

6. The method of claim 1 further comprising the step of:

encoding, encrypting, or encoding and encrypting the voting record including voting selections made during the voting session that is stored in the memory and then communicating the encoded and/or encrypted voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

7. The method of claim 1 further comprising the step of:

displaying during a voting session voting information for all offices, referenda, and/or questions all at one time; or displaying during a voting session voting information for all offices, referenda, and/or questions sequentially one office, referendum or question at a time; or displaying during a voting session voting information for all offices, referenda, and/or questions all at one time and displaying during a voting session voting information for all offices, referenda, and/or questions sequentially one office, referendum or question at a time.

8. The method of claim 1 further comprising the step of:

confirming the voting selections made during each voting session prior to the end thereof.

9. A voting system providing a printed confirmation of voting selections made, said voting system comprising:

means for initiating a voting session;

a voter interface for receiving voting selections made during the voting session;

a processor for creating a voting record including the voting selections made during the voting session and a unique randomly assigned identifying number;

a memory coupled to said processor for storing the voting record including the voting selections made during the voting session and the unique randomly assigned identifying number;

a printer for storing the voting record including the voting selections made during the voting session and the unique randomly assigned identifying number on a printed paper, wherein the printed paper is human readable, optically readable, or both human and optically readable; and means for providing the printed paper for verifying the voting selections made during the voting session that are printed on the printed paper.

10. The voting system of claim 9 further comprising means for modifying the voting record created during the voting session to include voting selections made after the providing an opportunity to verify the voting selections.

11. The voting system of claim 9 wherein the printed paper includes election information, date, time, polling place, voting district, election district, voting machine identifier, authentication information, authentication feature, security indicia, a security feature, or any combination thereof.

12. The voting system of claim 9 wherein said memory comprises a floppy disk, a computer hard disk, a writeable optical disk, a memory card, a memory module, a flash memory, a magnetic tape, an optical tape, a magnetic disk, an optical disk, a smart card, an electronically readable media printed on paper, an optically readable media printed on paper, a semiconductor memory, a random-access memory, a programmable read-only memory, or any combination thereof.

13. The voting system of claim 9 further comprising:

a communication interface coupled to said processor for communicating the voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

14. The voting system of claim 9 further comprising:

said processor encoding, encrypting, or encoding and encrypting the voting record including voting selections made during the voting session that is stored in the memory and then communicating the encoded and/or encrypted voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

15. The voting system of claim 9 further comprising:

means for displaying during each voting session voting information for all offices, referenda, and/or questions all at one time; or means for displaying during each voting session voting information for all offices, referenda, and/or questions sequentially one office, referendum or question at a time.

16. The voting system of claim 9 further comprising means for confirming the voting selections made during each voting session prior to the end thereof.

17. A method for voting providing a printed confirmation of voting selections made, said method comprising the steps of:

initiating a voting session;

providing for the voting session a unique identifier unrelated to the identity of a voter;

creating a voting record including voting selections made during the voting session and the unique identifier;

storing the voting record including the voting selections made during the voting session and unique identifier in a memory;

storing the voting record including the voting selections made during the voting session and the unique identifier on a printed paper, wherein the printed paper is human readable, optically readable, or both human and optically readable; and providing the printed paper for verifying the voting selections made during the voting session that are printed on the printed paper.

18. The method of claim 5 further comprising:

publishing the tallied and/or tabulated voting record, the unique randomly assigned identifying number, the voting selections, or a combination thereof;

posting on the Internet the tallied and/or tabulated voting record, the unique randomly assigned identifying number, the voting selections, or a combination thereof; or publishing the tallied and/or tabulated voting record, the unique randomly assigned identifying number, the voting selections, or a combination thereof, and posting on the Internet the tallied and/or tabulated voting record, the unique randomly assigned identifying number, the voting selections, or a combination thereof.

19. The voting system of claim 13 wherein the tallied and/or tabulated voting record, the unique randomly assigned identifying number, the voting selections, or a combination thereof, are published or are posted via the Internet, or are both published and are pasted via the Internet.

20. A method for voting providing a printed confirmation of voting selections made, said method comprising the steps of:

initiating a voting session;

providing a unique identifier unrelated to the identity of a voter;

creating a voting record including voting selections male during the voting session and the unique identifier;

storing the voting record including the voting selections made during the voting session and unique identifier in a memory;

storing the voting record including the voting selections made during the voting session and the unique identifier on a printed paper, wherein the printed paper is human readable, optically readable, or both human and optically readable; and providing the printed paper for verifying the voting selections made during the voting session that are printed on the printed paper.

21. A voting system providing a printed confirmation of voting selections made, said voting system comprising:

means for initiating a voting session;

a voter interface for receiving voting selections made during the voting session;

a processor for creating a voting record including the voting selections made during the voting session and a unique identifier;

a memory coupled to said processor for storing the voting record including the voting selections made during the voting session and the unique identifier;

a printer for storing the voting record including the voting selections made during the voting session and the unique identifier on a printed paper, wherein the printed paper is human readable, optically readable, or both human and optically readable; and means for providing the printed paper for verifying the voting selections made during the voting session that are printed on the printed paper.

22. A method for voting providing a printed confirmation of voting selections made, said method comprising the steps of:

initiating a voting session generating a unique randomly assigned identifying number for each voting session;

creating a voting record including voting selections made during the voting session and the unique randomly assigned identifying number;

storing the voting record including the voting selections made during the voting session and the unique randomly assigned identifying number in a memory;

storing the voting record including the voting selections made during the voting session on a printed paper, wherein the printed paper is human readable, optically readable, or both human and optically readable; and providing the printed paper for verifying the voting selections made during the voting session that are printed on the printed paper.

23. The method of claim 22 further comprising the step of:

after said providing the printed paper for verifying the voting selections, modifying the voting record created during the voting session to include voting selections made after said providing an opportunity to verify the voting selections.

24. The method of claim 22 wherein the printed paper includes election information, date, time, polling place, voting district, election district, voting machine identifier, authentication information, authentication feature, security indicia, a security feature, or any combination thereof.

25. The method of claim 22 wherein said storing the voting record including the voting selections made during the voting session in a memory comprises storing the voting record in a floppy disk, a computer hard disk, a writeable optical disk, a memory card, a memory module, a flash memory, a magnetic tape, an optical tape, a magnetic disk, an optical disk, a smart card, an electronically readable media printed on paper, an optically readable media printed on paper, a semiconductor memory, a random-access memory, a programmable read-only memory, or any combination thereof.

26. The method of claim 22 further comprising the step of:

communicating the voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

27. The method of claim 26 further comprising:

publishing the tallied and/or tabulated voting record, the unique randomly assigned identifying number, the voting selections, or a combination thereof;

posting on the Internet the tallied and/or tabulated voting record, the unique randomly assigned identifying number, the voting selections, or a combination thereof; or publishing the tallied and/or tabulated voting record, the unique randomly assigned identifying number, the voting selections, or a combination thereof, and posting on the Internet the tallied and/or tabulated voting record, the unique randomly assigned identifying number, the voting selections, or a combination thereof.

28. The method of claim 22 further comprising the step of:

encoding, encrypting, or encoding and encrypting the voting record including voting selections made during the voting session that is stored in the memory and then communicating the encoded and/or encrypted voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

29. The method of claim 22 further comprising the step of:

displaying during a voting session voting information for all offices, referenda, and/or questions all at one time; or displaying during a voting session voting information for all offices, referenda, and/or questions sequentially one office, referendum or question at a time; or displaying during a voting session voting information far all offices, referenda, and/or questions all at one time and displaying during a voting session voting information for all offices, referenda, and/or questions sequentially one office, referendum or question at a time.

30. The method of claim 22 further comprising the step of:

confirming the voting selections made during each voting session prior to the end thereof.

31. A voting system providing a printed confirmation of voting selections made, said voting system comprising:

means for initiating a voting session;

means for generating a unique randomly assigned identifying number for each voting session;

a voter interface for receiving voting selections made during the voting session;

a processor for creating a voting record including the voting selections made during the voting session and the unique randomly assigned identifying number;

a memory coupled to said processor for storing the voting record including the voting selections made during the voting session and the unique randomly assigned identifying number;

a printer for storing the voting record including the voting selections made during the voting session on a printed paper, wherein the printed paper is human readable, optically readable, or both human and optically readable; and means for providing the printed paper for verifying the voting selections made during the voting session that are printed on the printed paper.

32. The voting system of claim 31 further comprising means for modifying the voting record created during the voting session to include voting selections made after the providing an opportunity to verify the voting selections.

33. The voting system of claim 31 wherein the printed paper includes election information, date, time, polling place, voting district, election district, voting machine identifier, authentication information, authentication feature, security indicia, a security feature, or any combination thereof.

34. The voting system of claim 31 wherein said memory comprises a floppy disk, a computer hard disk, a writeable optical disk, a memory card, a memory module, a flash memory, a magnetic tape, an optical tape, a magnetic disk, an optical disk, a smart card, an electronically readable media printed on paper, an optically readable media printed on paper, a semiconductor memory, a random-access memory, a programmable read-only memory, or any combination thereof.

35. The voting system of claim 31 further comprising:

a communication interface coupled to said processor for communicating the voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

36. The voting system of claim 35 wherein the tallied and/or tabulated voting record, the unique randomly assigned identifying number, the voting selections, or a combination thereof, are published or are posted via the Internet, or are both published and are posted via the Internet.

37. The voting system of claim 31 further comprising:

said processor encoding, encrypting, or encoding and encrypting the voting record including voting selections made during the voting session that is stored in the memory and then communicating the encoded and/or encrypted voting record including voting selections made during the voting session that is stored in the memory to a common location, a separate location, a distant location, a central location, a central computer, or a combination thereof, for tallying voting selections, for tabulating the voting record, or for both tallying voting selections and tabulating the voting record.

38. The voting system of claim 31 further comprising:

means for displaying during each voting session voting information for all offices, referenda, and/or questions all at one time; or means for displaying during each voting session voting information for all offices, referenda, and/or questions sequentially one office, referendum or question at a time.

39. The voting system of claim 31 further comprising means for confirming the voting selections made during each voting session prior to the end thereof.

40. The method of claim 1 wherein said initiating a voting session comprises responding to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

41. The voting system of claim 9 wherein said means for initiating a voting session responds to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

42. The method of claim 17 wherein said initiating a voting session comprises responding to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

43. The method of claim 20 wherein said initiating a voting session comprises responding to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

44. The voting system of claim 21 wherein said means for initiating a voting session responds to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

45. The method of claim 22 wherein said initiating a voting session comprises responding to a button being pressed, a lever being moved, a handle being moved, a switch being moved, an identifying number being entered, a personal security code being entered, a personal identifying number being entered, a chip card being inserted, inserting a smart card, or a verifying a registration, for displaying voting information.

46. The voting system of claim 31 wherein said means for initiating a voting session responds to a button being pressed, a lever being moved, a handle being moved, a switch being moved, an identifying number being entered, a personal security code being entered, a personal identifying number being entered, a chip card being inserted, inserting a smart card, or verifying a registration, for displaying voting information.

* * * * *